Feb. 20, 1934.  W. M. HOLLOWAY  1,947,471
MEANS FOR AUTOMATICALLY SOLDERING THE SIDE
SEAMS OF CONTAINERS AND THE LIKE
Filed Oct. 16, 1929   12 Sheets-Sheet 8
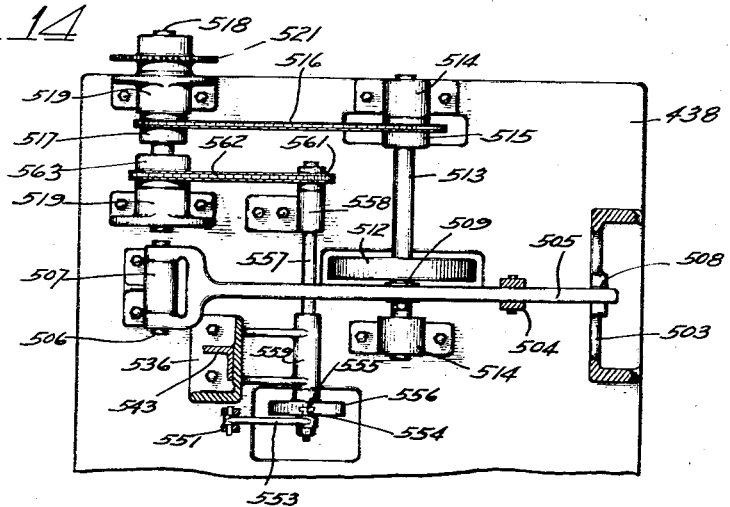
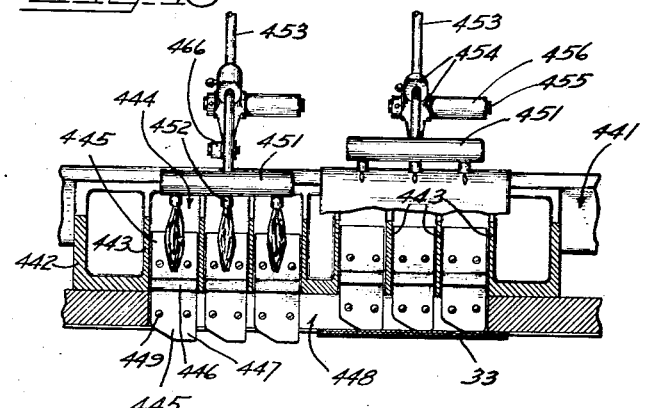
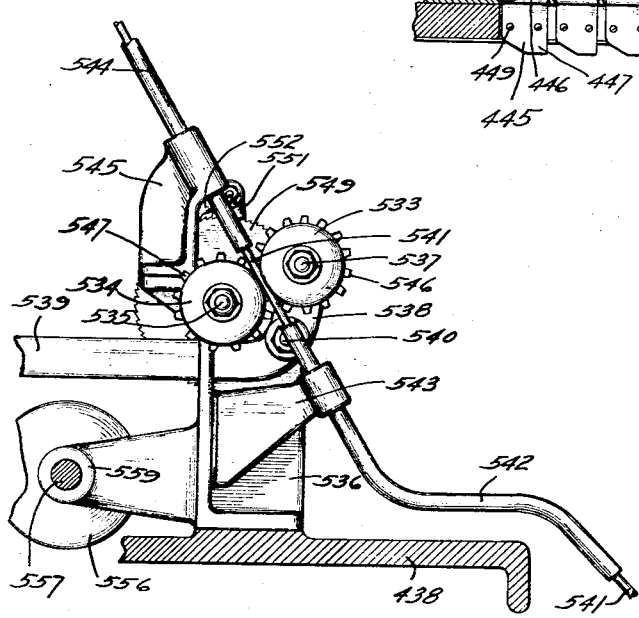
INVENTOR
William M. Holloway
BY John C. Carpenter
ATTORNEY Feb. 20, 1934.   W. M. HOLLOWAY   1,947,471
MEANS FOR AUTOMATICALLY SOLDERING THE SIDE
SEAMS OF CONTAINERS AND THE LIKE
Filed Oct. 16, 1929   12 Sheets-Sheet 9

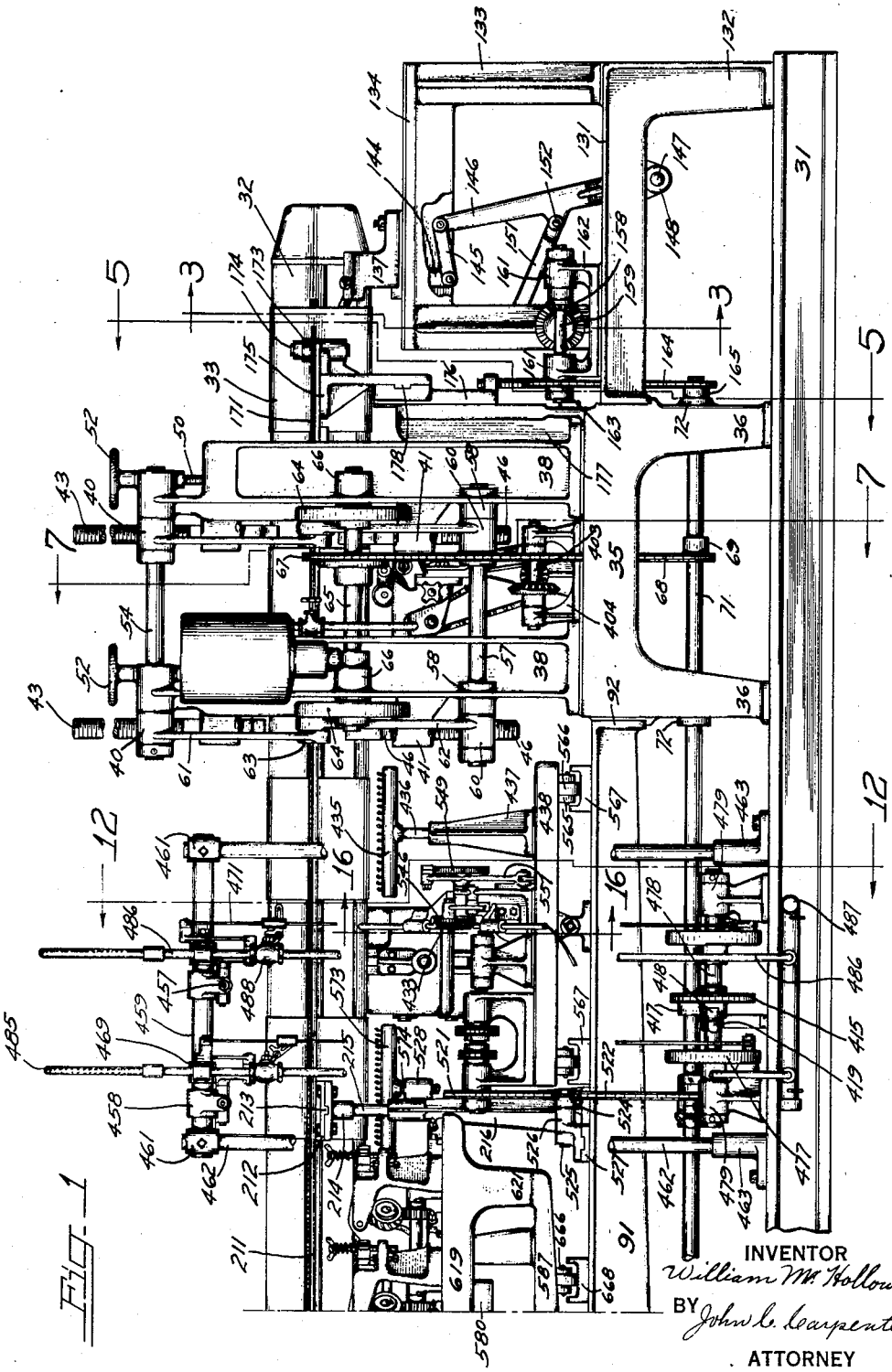

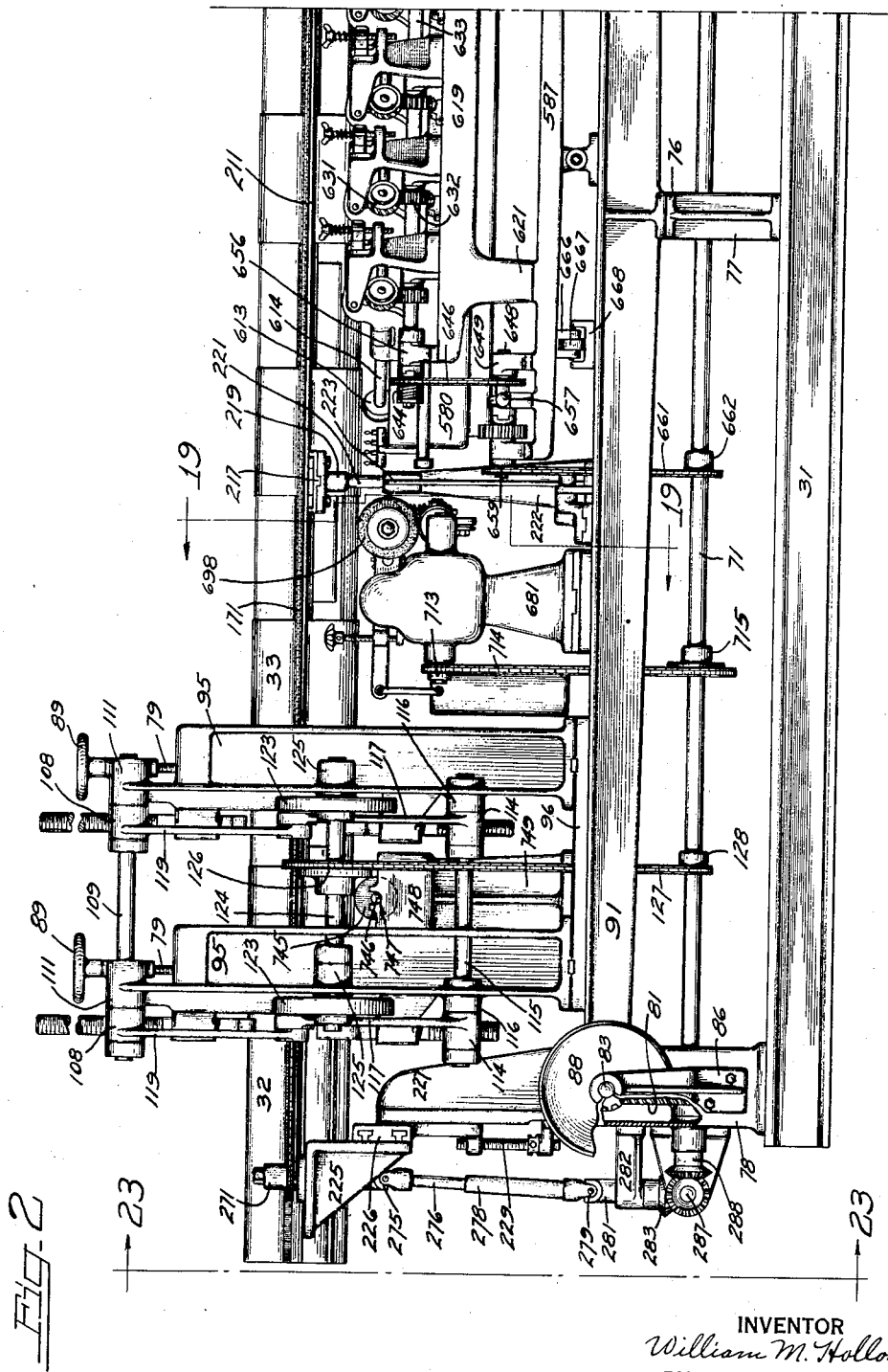

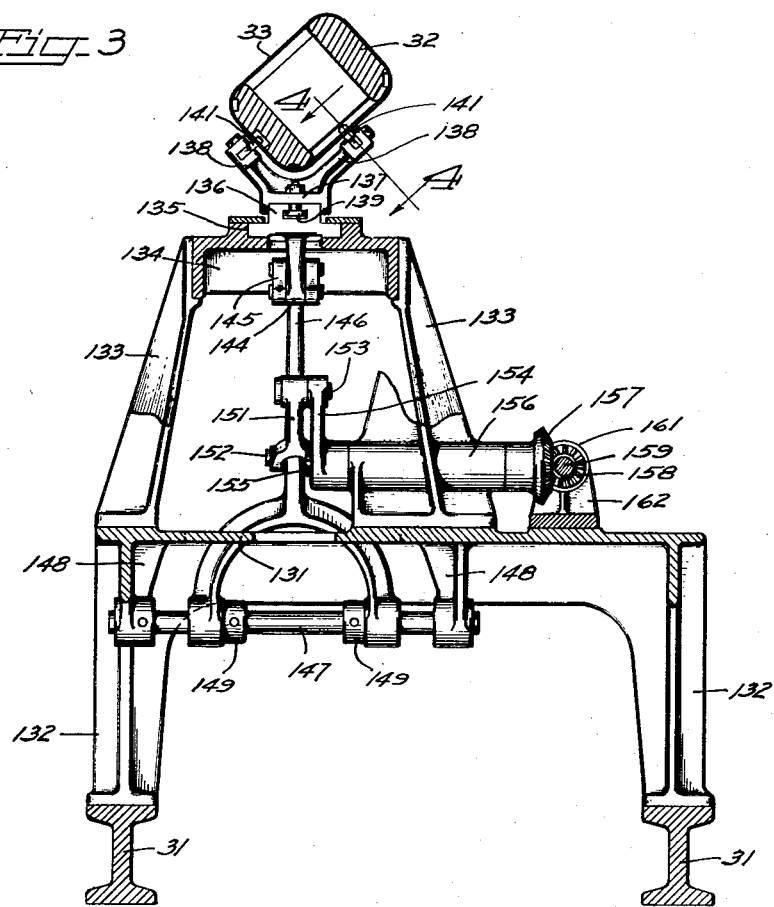
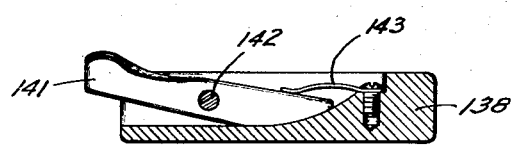

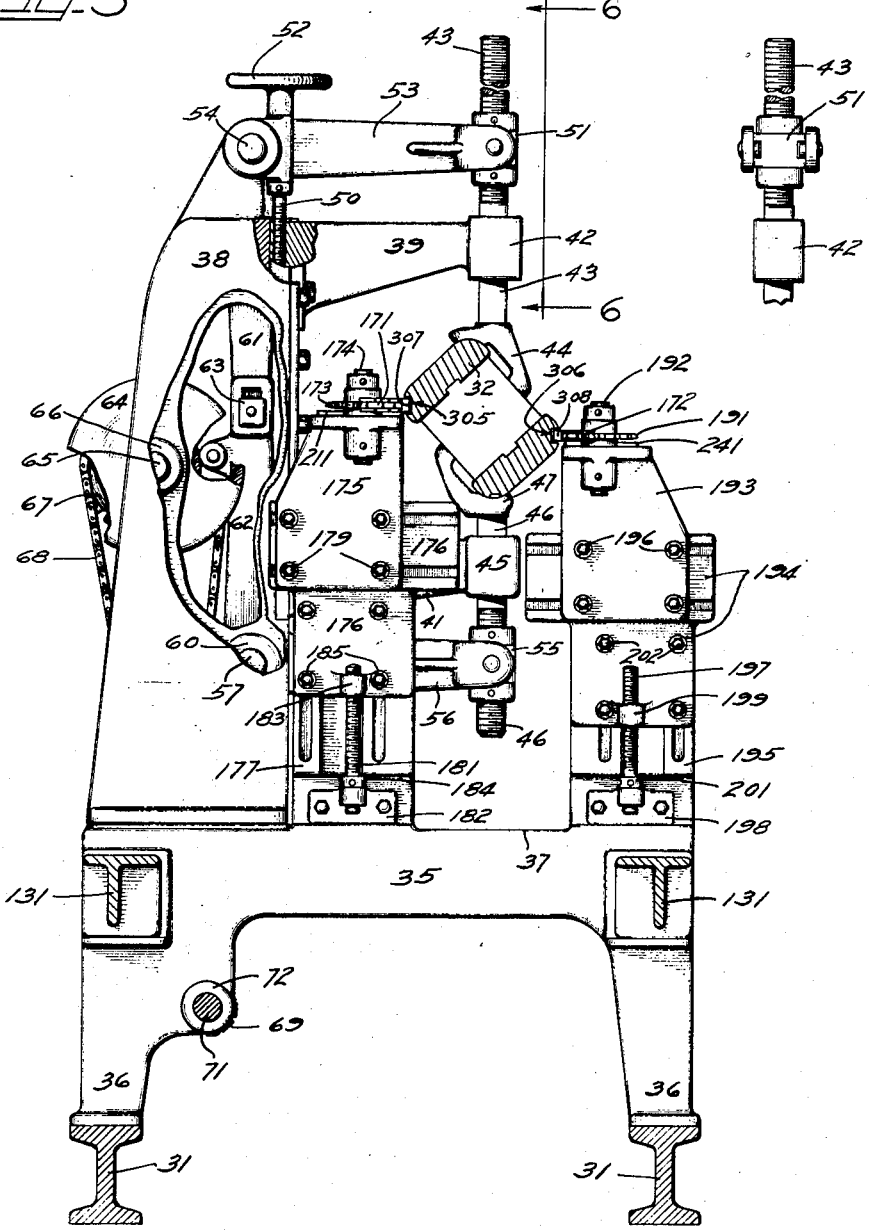

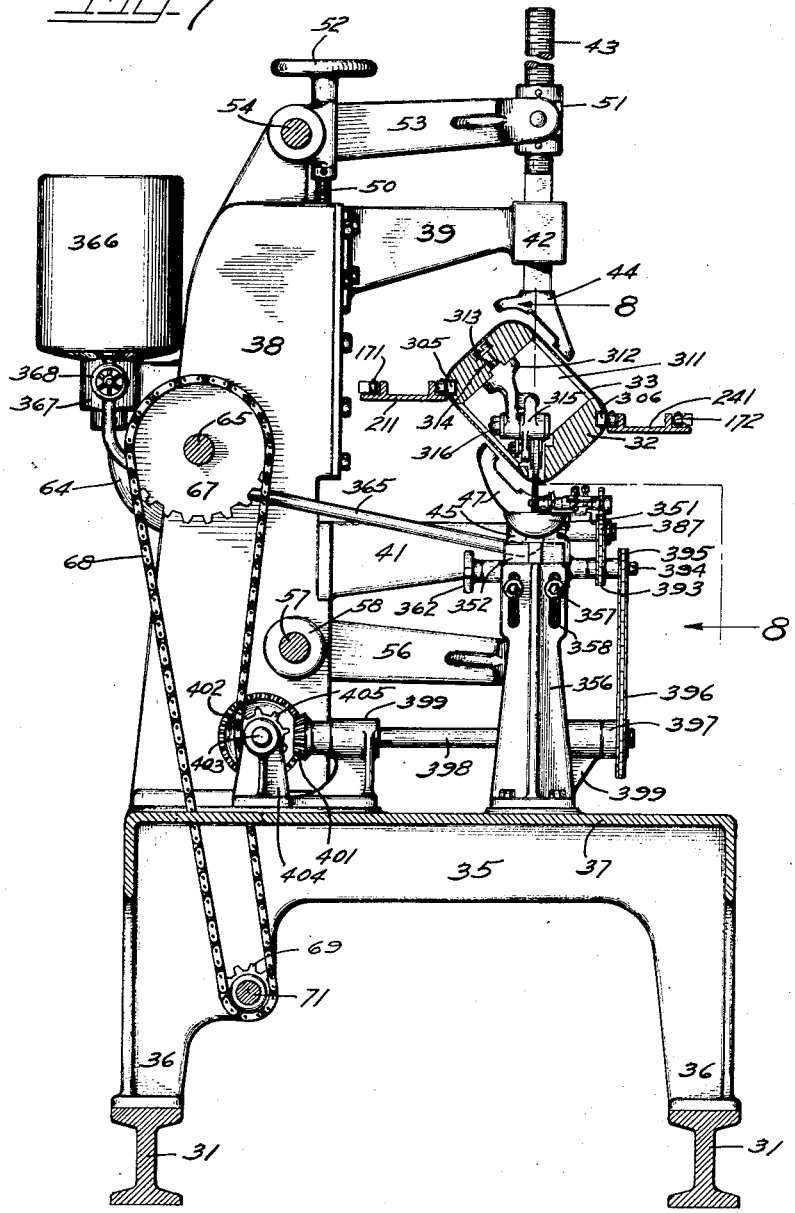

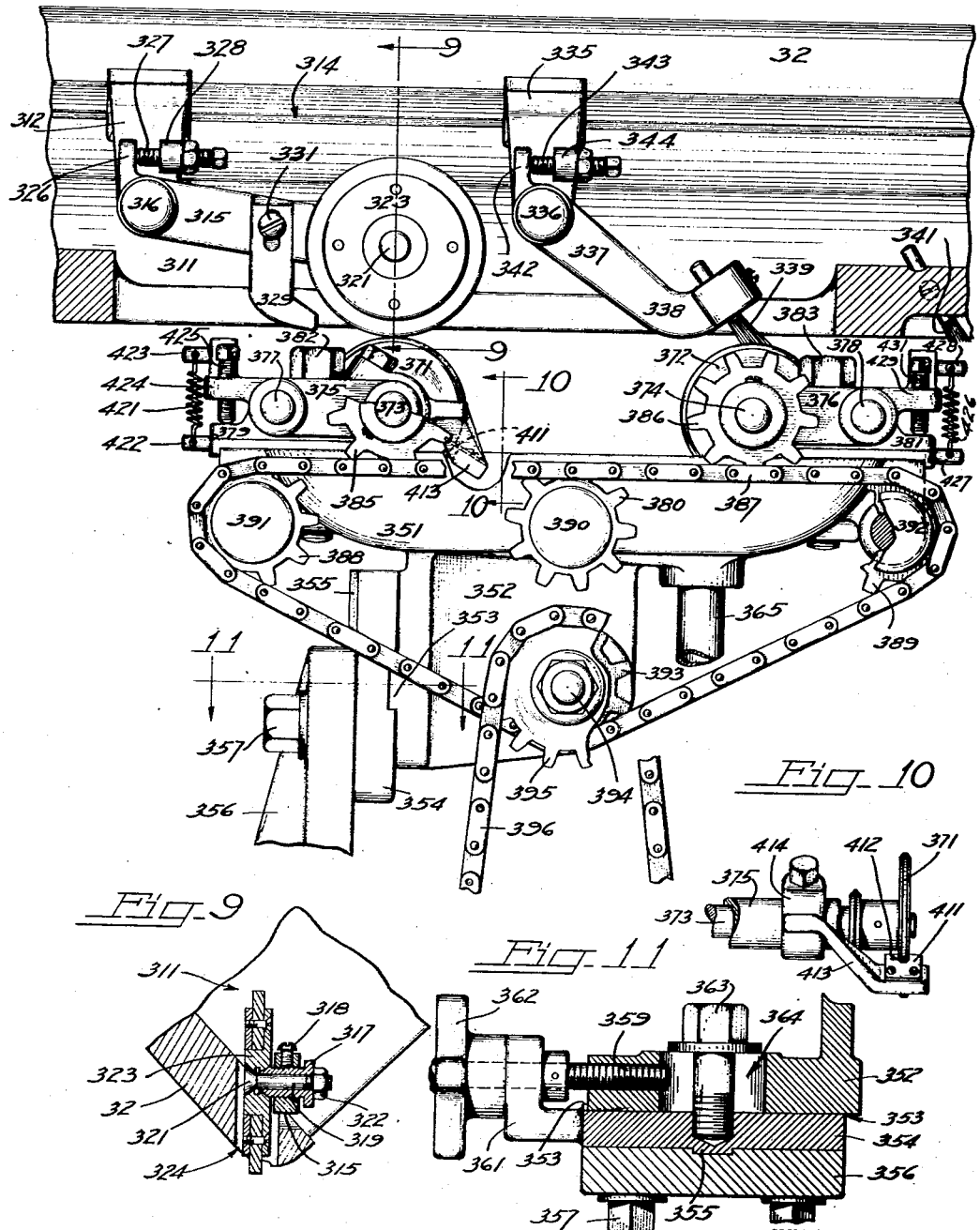

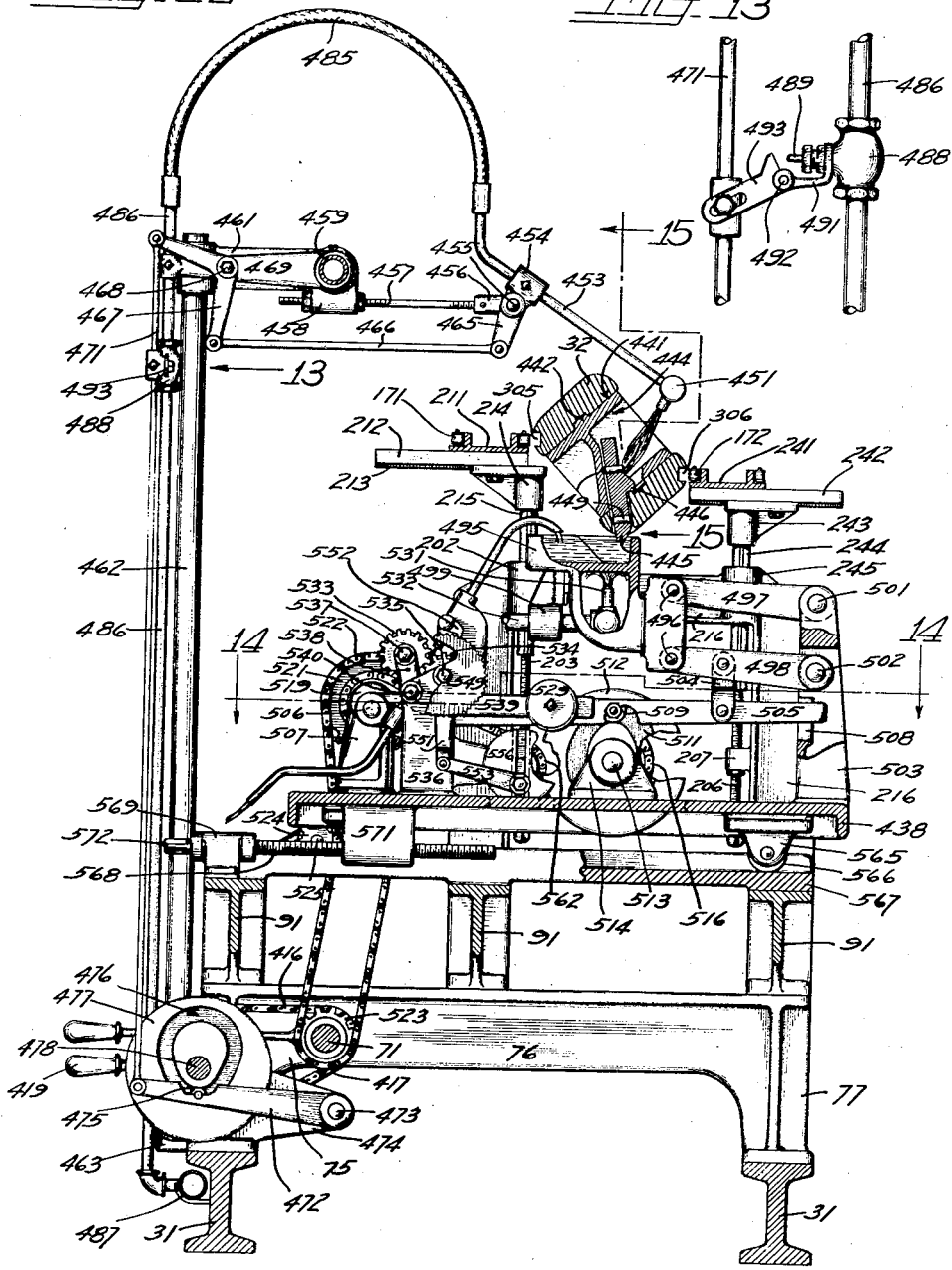

INVENTOR
William M. Holloway
BY
John C. Carpenter
ATTORNEY

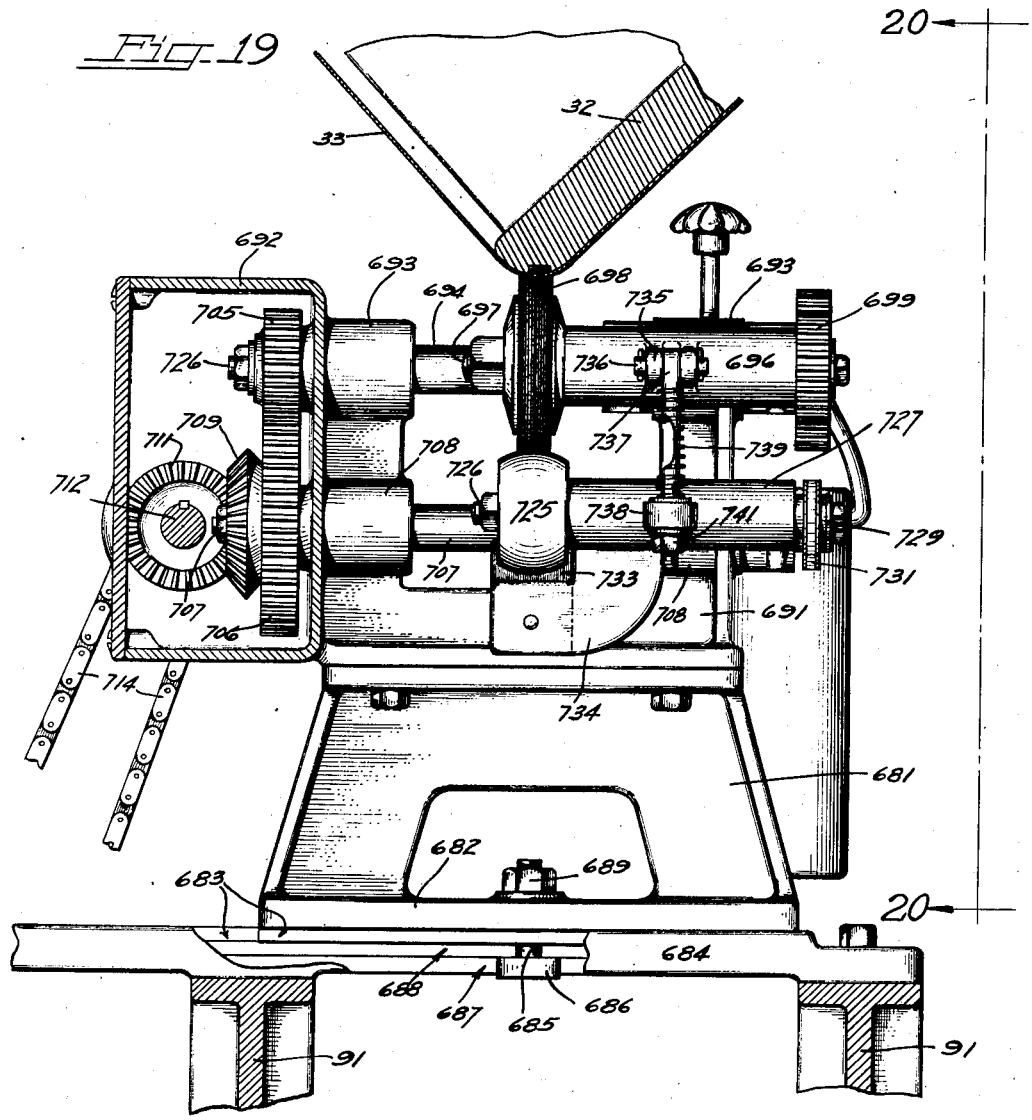

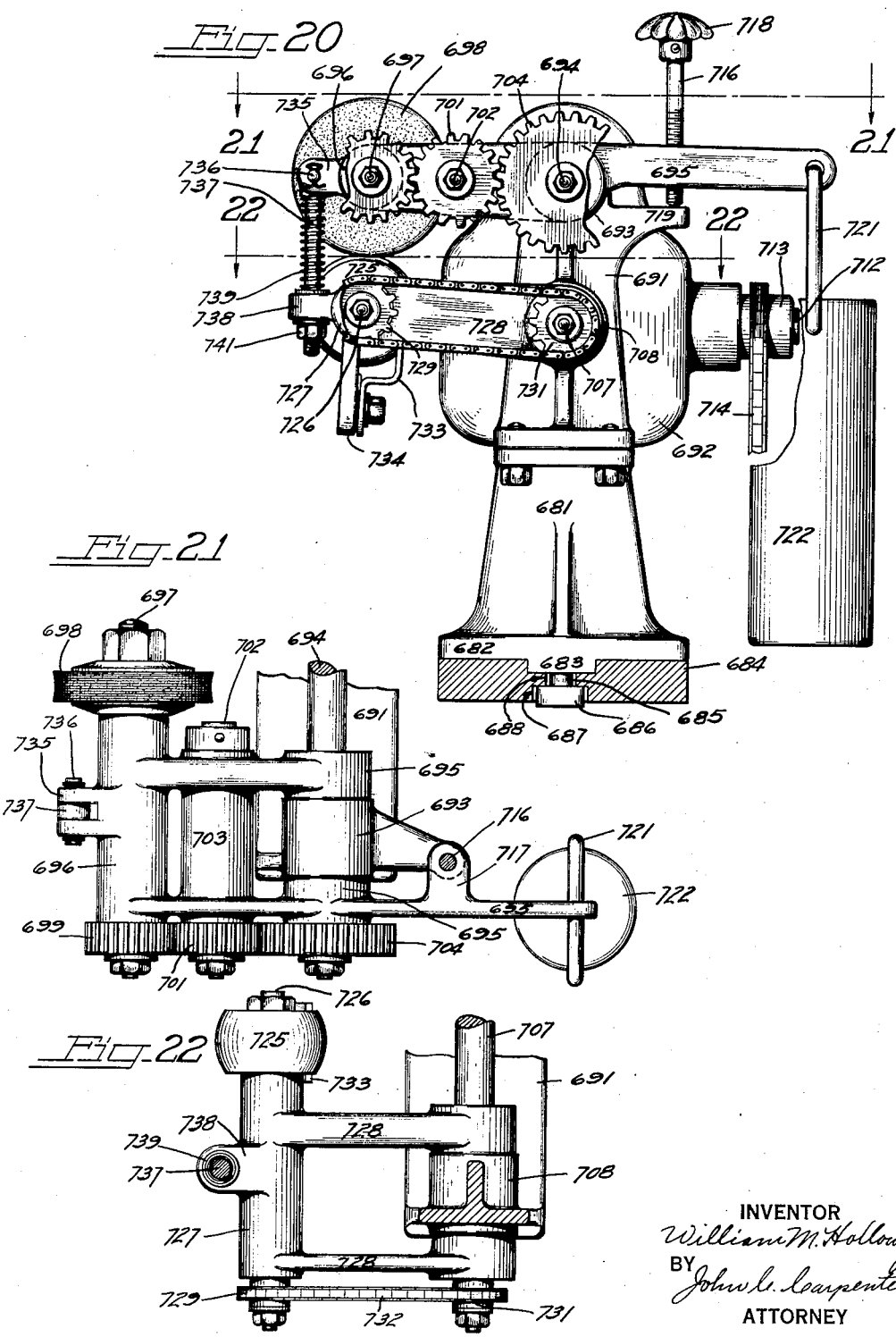

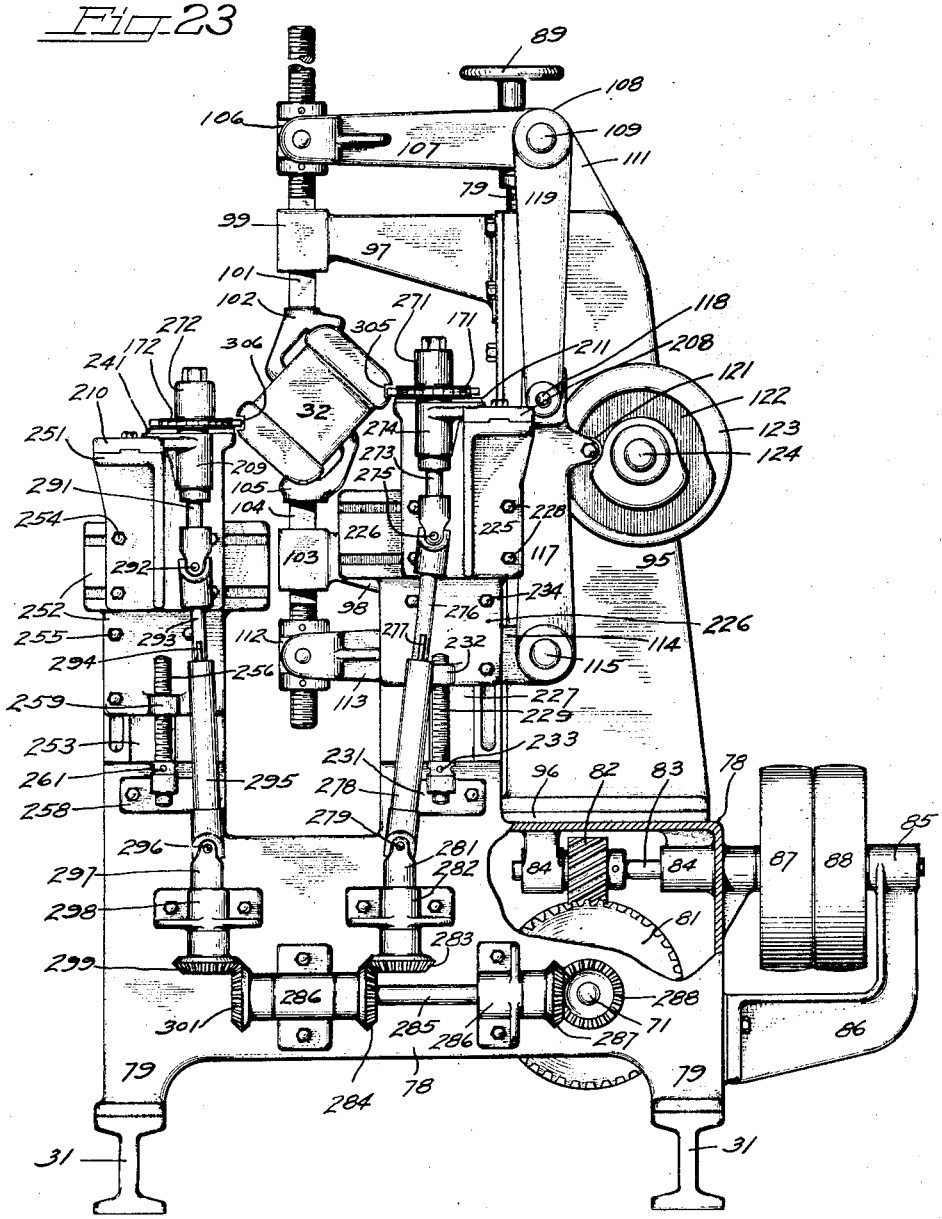

Patented Feb. 20, 1934

1,947,471

UNITED STATES PATENT OFFICE 1,947,471

MEANS FOR AUTOMATICALLY SOLDERING THE SIDE SEAMS OF CONTAINERS AND THE LIKE

William M. Holloway, Oak Park, Ill., assignor to American Can Company, New York, N. Y., a corporation of New Jersey Application October 16, 1929. Serial No. 400,105

32 Claims. (Cl. 113—62)

The present invention relates to an apparatus for soldering can bodies and has more particular reference to an apparatus for soldering the side seams of can bodies.

Two different types of soldering are employed in soldering the side seams of can bodies, these being outside soldering, which relates to the application of solder to the exterior of the can body along the side seam and inside soldering, which relates to the application of solder on the interior of the can along the side seam. Outside soldering is used quite generally for plain tin cans, while inside soldering is particularly adapted to lithographed or exteriorly decorated cans.

The present invention relates to a unit soldering machine provided with both outside and inside soldering mechanisms, and these mechanisms are so controlled as to permit use of the one to the exclusion of the other, or, if occasion requires, to permit the use of both types of soldering on the same can as it is conveyed through the machine.

The principal object of the present invention is the provision of a soldering apparatus having inside and outside soldering mechanisms.

An important object of the present invention is the provision of a number of unit soldering mechanisms mounted upon a common frame and utilizing a soldering horn over which the can bodies are conveyed through the apparatus.

An important object of the invention is the provision of a soldering apparatus having a complete inside soldering mechanism for applying solder to the inner surface of can bodies conveyed along a horn and a complete outside soldering mechanism for use in connection with the same soldering horn and for applying solder to the exterior of can bodies conveyed therealong.

An important object of the invention is the provision of a floating soldering horn over which can bodies are adapted to be positioned and thence to be conveyed therealong by a pair of opposed side chain feed devices engaging the can bodies at opposite points and moving them evenly along the horn without distortion or binding.

A further important object of the invention is the provision of an improved clamp for holding a floating soldering horn having free ends along which can bodies are conveyed, certain of these clamps operating to permit passing of the can body along the horn while other clamps hold the horn in a pre-determined horizontal plane while preventing longitudinal shifting of the same.

An important object of the invention is the provision of a soldering apparatus utilizing a soldering horn along which can bodies to be soldered are conveyed and having a plurality of sets of soldering instrumentalities for performing different soldering operations on the moving can body with a single fluxing mechanism adjustable for applying flux either to the interior of the passing can body, to its exterior, or to both interior and exterior, thus coordinating fluxing and soldering.

A still further important object of the invention is the provision of fluxing mechanism for applying flux to the part of a can body to be soldered and a heating device for drying the flux prior to application of the solder.

An important object of the present invention resides in an improved soldering mechanism for soldering the inner surface of the side seams of can bodies of a construction which permits the entire removal of the mechanism from soldering position.

Another important object of the invention resides in an improved inside soldering mechanism having soldering irons mounted within a soldering horn and heated for proper soldering, the heating mechanism including a gas burner having devices for diminishing the flow of gas through the burner and reducing the amount of heat furnished to the soldering irons as a can body passes along the soldering iron.

Still another important object of the invention is the provision of an outside soldering device for use in connection with a soldering horn along which can bodies are conveyed, the entire soldering mechanism being movable to position it for a soldering operation, or to withdraw it from operating position.

A still further important object of the invention is the provision of an improved outside soldering mechanism comprising a plurality of solder applying rollers so positioned and operated as to provide a maximum soldering efficiency for the soldering of the outer surface of can bodies being soldered.

An important object of the invention is the provision of an improved wiping mechanism for removing excess solder from a soldered can seam and for wiping the applied solder well into the seam.

Still another important object of the invention is the provision of an apparatus easily adjustable for a change of size or shape of can body to be soldered.

Numerous other objects and advantages of the invention will be apparent as it is better understood from the following description, which, taken in connection with the accompanying drawings, discloses a preferred embodiment thereof.

Referring to the drawings:—

Figure 1 is a front elevation of the entrance half of the soldering apparatus.

Fig. 2 is a front elevation of the exit half of the soldering apparatus, this figure joined with Fig. 1 constituting a complete front elevation.

Fig. 3 is a transverse sectional view taken substantially along line 3—3 in Fig. 1.

Fig. 4 is an enlarged sectional detail taken substantially along line 4—4 in Fig. 3.

Fig. 5 is a transverse sectional view taken substantially along line 5—5 in Fig. 1.

Fig. 6 is a fragmentary elevation of a part of one of the upper horn clamping devices the view being taken from a plane indicated by the trace line 6—6 in Fig. 5.

Fig. 7 is a transverse sectional view taken substantially along line 7—7 in Fig. 1.

Fig. 8 is an enlarged combination section and elevation taken substantially along line 8—8 in Fig. 7.

Fig. 9 is an enlarged fragmentary section taken substantially along line 9—9 in Fig. 8.

Fig. 10 is a fragmentary detail of a fluxing roller, the view being taken substantially along line 10—10 in Fig. 8.

Fig. 11 is an enlarged sectional plan detail taken substantially along line 11—11 in Fig. 8.

Fig. 12 is a transverse sectional view taken substantially along line 12—12 in Fig. 1.

Fig. 13 is a fragmentary side elevation of the gas burner control valve viewed from a position indicated by the arrow 13 in Fig. 12.

Fig. 14 is a sectional plan view taken substantially along line 14—14 in Fig. 12.

Fig. 15 is a fragmentary sectional view, parts illustrated in elevation, taken substantially along the broken line 15—15 in Fig. 12.

Fig. 16 is an enlarged sectional view taken substantially along line 16—16 in Fig. 1.

Fig. 19 is an enlarged transverse sectional view taken substantially along line 19—19 in Fig. 2.

Fig. 20 is a front elevation, parts broken away, of the wiping device, the view being taken from a plane positioned as indicated by the trace line 20—20 in Fig. 19.

Fig. 21 is a sectional plan view, parts broken away, taken substantially along line 21—21 in Fig. 20.

Fig. 22 is a sectional plan view taken substantially along line 22—22 in Fig. 20.

Fig. 23 is an end elevation of the apparatus, the view being taken looking toward the discharge end of the machine from a plane positioned as indicated by the trace line 23—23 in Fig. 2.

Figure 18:
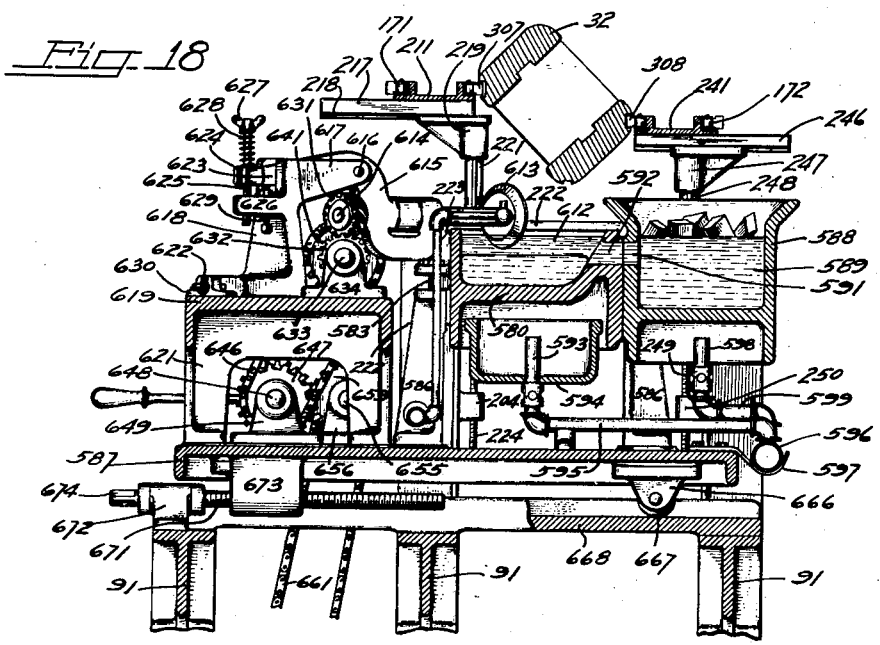
Fig. 18 is a transverse sectional view taken substantially along the broken line 18—18 in Fig. 17.

In general, the apparatus for carrying out the present invention is mounted upon a base unit formed of spaced I-beams 31 (Figs. 1, 2 and 3). This base member supports the entire mechanism, the various units for performing the different operations on a can body passing through the machine being suitably carried by supporting frames and brackets, as will be fully described.

A relatively long soldering horn 32 is provided for guiding can bodies 33 throughout the entire length of the machine. Horn 32 is free at each end permitting it to receive the can bodies over one end and to discharge them from over its opposite end. Mechanism automatically pushes the hollow container or can body 33 over the entrance end of the horn 32 and other mechanism conveys the same along the horn. During the passage of the can body flux, heat and solder are successively applied to its side seam or other part to be soldered after which the applied solder is suitably wiped and the solder joint partially cooled so that the can body is discharged from the discharge end of the horn with the soldering operations fully completed.

Horn 32 is held in a predetermined horizontal and vertical plane by devices which permit the passage of the can bodies 33 therealong in spaced and processional order without any interruption in their travel. The holding devices for accomplishing this purpose will now be described.

Near the entrance end of horn 32 (illustrated on the right in Fig. 1) there is provided a frame 35 having four legs 36 (see also Figs. 5 and 7) one pair of legs being mounted on one of the I-beams 31, the other pair of legs being mounted on the I-beam on the opposite side of the machine. Frame 35 is provided with an upper surface or table 37 which carries a pair of columns 38 positioned along its front edge, each column supporting an outwardly extending upper bracket 39 and a similar lower bracket 41.

Each bracket 39 is vertically adjustable on its frame 38 and carries a boss 42 through which operates a vertical rod 43 carrying at its lower end a clamping shoe 44. Each bracket 41 is bolted to its column 38 and carries a boss 45 through which operates a vertical rod 46 carrying at its upper end a clamping shoe 47. There is disclosed in the drawings, two clamping shoes 44 and two clamping shoes 47 for the forward end of the horn 32. A similar number of shoes or other clamping devices are provided for the rear end of the horn as will be hereinafter described.

Rods 43 and 46 move within their respective bearings to clamp and unclamp the horn 32 at predetermined intervals of time. One set of clamps 44 and 47 are in horn engaging position while the other set of clamps are separated from the horn. It is while a set of clamps are separated from the horn that the can body 33 passes therealong at that position and immediately following the passing of the can body, the separated clamps are brought down into clamping position and the other set of clamps are separated to permit continued movement of the can body.

Each rod 43 (Figs. 6 and 7) is threaded at its upper end and is engaged by an adjustable trunnion member 51 pivotally connected to the forward end of an arm 53 of a bellcrank lever 40 mounted upon a shaft 54 held in the upper end of column 38. A threaded screw 50 rotatable with a handwheel 52 secured to its upper end has threaded engagement with each bracket 39 and turns freely within the upper end of the column 38 providing means for adjusting bracket 39 in vertical position.

Each rod 46 (Figs. 1 and 5) is threaded at its lower end and is engaged by an adjustable trunnion member 55 similar to the member 51 and is pivotally connected to the forward end of an arm 56 of a bellcrank lever 60 mounted upon a shaft 57 held in bearings 58 formed in the column 38.

Each bellcrank lever 40 has an arm 61 at right angles to its arm 53 and each bellcrank lever 60 has an arm 62 which is at right angles to its arm 56. One end of each arm 61 is pivotally connected at 63 to one end of an associated arm 62 this forming an interconnection between bellcrank 40 and its associated bellcrank 60.

Each arm 62 carries a cam following roller which is actuated by a cam 64 mounted on a horizontal shaft 65 journaled in bearings 66 formed in the columns 38. Actuation of each arm 62, by reason of its pivotal connection 63 causes a simultaneous movement of arm 61 and the associated arms 53 and 56. This insures simultaneous clamping action of each set of shoes 44 and 47 against the horn 32.

One cam 64 is opposed in its action to the opposite cam 64 and this insures the proper coordination of the two sets of clamping members 44 and 47 to permit proper movement of the can body 33 as previously explained. Shaft 65 (Figs. 1 and 7) carries a sprocket 67 over which operates a link chain 68 moving at its lower end over a sprocket 69 carried by a drive shaft 71 journaled in bearings 72 in the frame 35.

Shaft 71 (Figs. 1 and 2) is a main power shaft and extends substantially throughout the entire length of the apparatus. Besides the bearings 72 in the frame 35, shaft 71 is journaled in certain intermediate bearings associated with both the inside soldering and the outside soldering mechanisms.

The opposite end of shaft 71 is journaled in an end housing 78 having feet 79 (Fig. 23) mounted upon and connecting the discharge end of the base members 31. Housing 78 encases a gear mechanism for transmitting power to the power shaft 71. Shaft 71 carries a worm wheel 81 which meshes with a worm 82 rotating with a drive shaft 83 journaled in bearings 84 carried by the housing 78 and in a bearing 85 formed in a bracket 86 secured to one side of the housing. Drive shaft 83 is rotated in the usual and preferred manner as by belt connection with a drive pulley 87 secured to the drive shaft.

An idler pulley 88 may also be mounted on the drive shaft 83 such a construction providing a typical belt power drive. All the operating parts of the apparatus are connected in some manner with the power shaft 71 as will be fully explained hereinafter.

For the purpose of supporting the discharge end of the horn 32, there are provided spaced T-rails 91 (Figs. 1, 2 and 12) carried at one end by the housing 78 and connected at their opposite ends as at 92, to the frame 35. A frame 76 formed with legs 77 is positioned intermediate the ends of the rails 91 and provide supports for their central portions the legs 77 resting upon and connecting the I-beams 31.

Columns 95 (Figs. 2 and 23) are mounted in spaced relation along one end of a table 96 which extends across and rests upon the spaced rails 91. Each column 95 carries spaced projecting brackets 97 and 98, the bracket 97 carrying a boss 99 through which a rod 101 has vertical movement. Each rod 101 carries at its lower end a clamping shoe 102 adapted to engage the upper corner of the horn 32. In similar manner bracket 98 carries a boss 103 in which a rod 104 extends and has vertical movement. Each rod 104 carries at its upper end a clamping shoe 105. Each shoe 105 is adapted to cooperate with one of its corresponding clamping shoes 102 for clamping and holding the discharge end of the horn 32 in a predetermined vertical and horizontal plane.

Each bracket 98 is secured to one of the columns 95 and each bracket 97 is adjustably bolted to its associated column 95. A vertical rod 79 turning freely in the upper part of the column has threaded engagement with the bracket 97 and upon being rotated by a handwheel 89 secured to its upper end, raises and lowers the bracket to its adjusted position.

The two sets of shoes 102 and 105 have alternating clamping action to permit separation from the horn 32 to allow passage of the can body 33 therealong while the other set of clamps are holding the horn in fixed position.

Each rod 101 is threadedly secured at its upper end to an adjustable trunnion member 106 pivotally carried on one end of an arm 107 of a bellcrank lever 108 mounted on a shaft 109 held in bearings 111 projected from the columns 95.

In like manner, each rod 104 is threadedly connected at its lower end to a trunnion member 112 pivotally carried on one end of an arm 113 of a bellcrank lever 114 mounted on a shaft 115 held in bearings 116 formed in the columns 95. An arm 117 of the bellcrank lever 114 pivotally connects at 118 to an arm 119 of the bellcrank lever 108. Arm 117 carries a cam-following roller 121 which operates in a cam groove 122 of a cam 123 mounted on a horizontal shaft 124 journaled in bearings 125 formed in columns 95. Shaft 124 carries a sprocket 126 (Fig. 2) over which operates a chain 127 passing over a sprocket 128 secured to the power shaft 71.

Rotation of shaft 71 through the chain drive 126, 127 and 128 causes a corresponding rotation of shaft 124 and cams 123 and this effects movement through the cam rollers 121 and the arms 117 and 119 to rock the bellcrank levers 114 and 108 respectively. A simultaneous clamping action against the horn 32 results. In the present embodiment of the invention there are two sets of clamping shoes 102 and 105 with their corresponding rods 101 and 104 and levers 108 and 114. There are, also, two cams 123, one of which is opposed in its action to the other. This insures the proper coordination of the two sets of clamping members to permit proper movement of the can body 33 along the horn 32.

A feeding mechanism is provided for moving a can body 33 over the entrance end of horn 32, this mechanism being mounted upon a table 131 (Figs. 1 and 3) provided with legs 132 at one end thereof resting on the base members 31, the table at its opposite end being secured to the frame 35. Brackets 133 are supported on table 131 and the former carry an auxiliary table 134 held spaced from and above the table 131. Auxiliary table 134 is provided with a longitudinal guideway 135 in which operates a slide 136. A yoke member 137 provided with arms 138 is adjustably secured to the slide 136 by a bolt 139 (Fig. 3).

The can bodies 33 are initially positioned at the forward end of horn 32 (Fig. 1) and placed in axial alignment therewith by any suitable mechanism. Such a mechanism may be a part of a can body maker or it may be an independent machine. From this initial position, they are engaged by spring pressed dogs 141 (see also Fig. 4) pivotally connected at 142 to each arm 138. A leaf spring 143 secured to an arm 138 projects over the rear end of the dog 141 and yieldingly holds the same with its forward end projecting beyond the face of its arm 138.

Slide 136 carrying its yoke 137 is moved back and forth within the guideway 135 of the table 134 by a link and lever device illustrated in Figs. 1 and 3. Slide 136 is provided with an extension 144 pivotally connected to links 145, in turn, pivotally connected to a lever 146 mounted on a horizontal shaft 147 carried in brackets 148 projected from the lower surface of the table 131.

Lever 146 rocks freely on shaft 147 being held in lateral position by spaced collars 149 pinned to the shaft. Lever 146 is oscillated by a crank, shaft and gear connection receiving actuation from the shaft 71. A link 151 is pivotally connected to lever 146 at 152 and is pivotally connected at 153 to a crank-arm 154 carried by a horizontal shaft 155 journaled for rotation within a bearing 156 formed in one of the brackets 133. Shaft 155 carries a bevel gear 157 which meshes with a similar gear 158 carried by a horizontal stub shaft 159 journaled in bearings 161 formed in a bracket 162 mounted upon table 131.

Shaft 159 also carries a sprocket 163 over which operates a link chain 164 passing at its lower run over a sprocket 165 carried by the power shaft 71. Constant rotation of the power shaft 71 is transmitted to shafts 159 and 155 whereupon crank-arm 154 causes reciprocation of the lever 146 and a resulting sliding movement of the slide 136 and feed dogs 141. This movement of the slide and feed dogs forces the can body 33 over the entrance end of the horn and moves it along the horn to a position where it is engaged by a conveyor mechanism.

The conveyor mechanism for propelling the can bodies 33 through the machine and along horn 32 comprises endless chain conveyors arranged on opposite sides of the horn and having movement in a horizontal plane, each conveyor moving alongside of the horn for substantially its entire length. During this travel they are properly supported and guided.

Two endless chains 171 and 172 constitute the conveyors, and move in horizontal planes on opposite sides of the horn 32. At the entrance end of the machine, chain 171 passes over an idler sprocket 173 (Figs. 1 and 5) mounted on a vertical stub shaft 174 carried on a block 175 having a horizontal sliding connection with a plate 176 which, in turn, has a vertical sliding connection with a bracket 177 carried by the frame 35. Block 175 and plate 176 have a tongue and groove connection 178 which permits horizontal movement of the plate relative to the block and at the same time prevents any vertical displacement. Block 175 is held in adjusted position on plate 176 by bolts 179, threaded through block 175 and bearing against plate 176.

In like manner, plate 176 and bracket 177 have a tongue and groove connection permitting vertical adjustment of the plate at the same time preventing any horizontal displacement. Easy adjustment of the plate 176 is made possible by the provision of a vertical screw 181 supported on a bracket 182 bolted to the side of bracket 177 the screw having rotary movement in the bracket. Screw 181 has threaded connection in a boss 183 projected from one face of the plate 176 and the screw is turned for raising and lowering the plate, spanner holes 184 being formed in a part of the screw. When in adjusted position, plate 176 is clamped to bracket 177 by bolts 185 after the manner of clamping of the plate 175.

The described connections between block 175, plate 176 and bracket 177 permit a wide range of adjustment for the shaft 174 and sprocket 173 both horizontally and vertically.

In a similar manner, chain 172 (Figs. 1 and 5) at the forward end of the machine passes over a sprocket 191 rotating on a stub shaft 192 carried on the upper end of a block 193 horizontally adjustable in a plate 194 supported in a vertical position in a bracket 195 carried by the frame 35. Block 193 and plate 194 have a tongue and groove connection to permit this horizontal adjustment and are held in adjusted position by bolts 196. In similar manner, plate 194 has a tongue and groove connection with the bracket 195 which permits its vertical adjustment only.

Easy adjustment between plate and bracket is provided for by a vertical screw 197 resting upon and having free rotation within a bracket 198 projected from one side of the bracket 195, the screw 197 having threaded connection with a boss 199 formed in the face of the plate 194. Screw 197 is easily rotated within its bracket 198 by connection with spanner holes 201 formed therein. In adjusted position, block 194 is rigidly clamped to the bracket 195 by clamping bolts 202.

The described connections between block 193, plate 194 and bracket 195 permit a wide range of adjustment for the shaft 192 and sprocket 191 both vertically and horizontally. The chains 171 and 172 at the discharge end of the apparatus pass over and are suitably operated by sprockets which will be hereinafter described.

Conveyor chain 171 is supported upon a horizontal channel iron 211 (Figs. 1 and 7) which extends adjacent to and throughout the length of the horn 32. Channel 211 is carried at the end adjacent the entrance end of the machine on the block 175 (see also Fig. 5).

Channel 211 (Figs. 1 and 12) is supported intermediate its ends on a sliding block 212 located adjacent an inside soldering mechanism and the block has a tongue and groove connection 213 with a head 214 carried on the upper end of a vertical rod 215 adjustably held relative to a bracket 216. Bracket 216 is carried on two of the rails 91 and consists of two vertical members resting on the rails and a horizontal member. Rod 215 is splined in a boss 202 formed in bracket 216 and rests on the end of a screw 203 which has threaded connection in a part of one of the vertical legs of bracket 216.

By reason of the adjustability afforded by the described connections applying both horizontally and vertically between the supporting bracket 216 and the block 212, channel 211 may be properly positioned relative to the horn 32.

Channel 211 is supported at another intermediate position this being adjacent an outside soldering mechanism, as illustrated in Figs. 2 and 18. Channel 211 is carried on a block 217 having a tongue and groove connection 218 with a head 219 held on the upper end of a vertical rod 221 vertically positioned within a bracket 222 of the same pattern as the bracket 216. Bracket 222 is carried on two of the rails 91 and consists of two vertical members resting on the rails and a horizontal connecting member. Rod 221 is splined in a boss 223 formed in bracket 222 and rests on a screw 224 which has threaded connection in a part 204 projected from one of the vertical legs of bracket 222. These described vertical and horizontal adjustments permit exact positioning of the channel 211 relative to the horn 32 at that place.

The end of channel 211 adjacent the discharge end of the machine is carried on a block 225 (Fig. 23) which has a horizontally adjustable connection with a plate 226. Plate 226 has a similar sliding connection for vertical adjustment with a bracket 227 upwardly projected from the housing 78. After being brought to adjusted position, block 225 is clamped on the plate 226 by bolts 228.

Plate 226, in its vertical adjustment relative to the bracket 227, makes use of an adjusting screw 229 rotatably mounted in a bracket 231 bolted against the outer face of the housing 78, screw 229 having theaded connection with a boss 232 carried by the plate 226 and being rotated by a wrench or other tool applied to spanner openings 233 formed therein. When in adjusted position, plate 226 is securely held against the bracket 227 by bolts 234.

Conveyor chain 172 is supported throughout its extent in a manner similar to the support of the chain 171 just described. For this purpose there is provided a channel iron 241 extending along one side of the horn 32. Channel iron 241 is supported at the entrance end of the horn on the block 193 (Fig. 5), at intermediate points adjacent the inside soldering mechanism (Fig. 12) and the outside soldering mechanism, (Fig. 18) and at the discharge end of the horn on an adjustable bracket (Fig. 23).

The block 193 and its adjustment have already been described and the channel iron's first intermediate connection adjacent the inside soldering mechanism comprises a block 242 (Fig. 12) having a horizontally movable connection with a head 243 carried by a vertical rod 244 having vertical adjustment within a boss 245 formed on the bracket 216 opposite the boss 202. Rod 244 is splined in the boss 245 and rests on the end of a screw 206 which has threaded connection in an extension 207 projecting from one of the vertical legs of bracket 216. This connection permits full adjustment both vertically and horizontally of channel 241 and the chain carried thereby relative to the horn 32.

Channel 241 at its second intermediate support adjacent the outside soldering mechanism is carried on a block 246 (Fig. 18) having horizontal adjustment with a head 247 carried on the upper end of a rod 248 which is adjustable vertically in a boss formed in the bracket 222 opposite the boss 223 previously described. Rod 248 is splined in its boss and rests on the end of a screw 249 which has threaded connection in an extension 250 projecting from one of the legs of bracket 222. This affords vertical and horizontal adjustment and permits proper positioning of channel 241, and the chain carried thereby, relative to the horn 32.

Channel 241 at its opposite end is carried on a block 251 (Fig. 23) having a horizontal adjustable connection with a plate 252, in turn, vertically adjustable relative to and carried by a bracket 253 upwardly extending from the housing 78. Block 251 is secured in adjusted position by bolts 254 and plate 252 is secured in adjusted position by bolts 255.

To assist in the vertical adjustment of the plate 252, there is provided a threaded screw 256 having rotation within and supported by a bracket 258 bolted to one face of the housing 78. The upper end of screw 256 is threadedly engaged within a boss 259 formed in the plate 252 and rotary movement of the screw 256 through the medium of a wrench or other tool applied to spanner holes 261 formed therein moves the plate 252 vertically for proper adjustment.

The conveyor chains 171 and 172 at the discharge end of the machine pass over sprockets which are constantly rotating and which transmit driving power for propelling the can bodies along the horn. These sprockets are illustrated in Fig. 23, the chain 171 being carried by a sprocket 271 and chain 172 being carried by a similar sprocket 272. By reason of the rotation of the sprockets 271 and 272 the chains 171 and 172 on their inner runs pass along the horn 32 from the entrance end of the horn to the discharge end and on their outer run turn back over the sprockets and move in the opposite direction.

Sprocket 271 and its driving connections will first be described, the sprocket being secured to a vertical shaft 273 rotating in a boss 274 formed in a plate 208 adjustably clamped on the block 225. The line of adjustment between plate 208 and block 225 is longitudinally of the horn 32 and affords a means of tightening the chain 171 between its sprockets 174 and 271. The lower end of shaft 273 is connected, by a universal joint 275, with a shaft 276 having a feathered and sliding connection 277 within a sleeve 278 carrying a universal joint 279 which connects with a vertical stub shaft 281 rotating in a bearing formed in a bracket 282 bolted to one side of the housing 78.

Shaft 281 carries at its lower end a bevel gear 283 which meshes with a corresponding gear 284 rotating with a horizontal shaft 285 on which it is secured, the shaft being journaled in bearings formed in brackets 286 bolted to the side wall of housing 78. Shaft 285 also carries a bevel gear 287 which meshes with a similar gear 288 carried by the power shaft 71.

Whenever adjustment is made, movement takes place between the block 225 and plate 226 and between plate 226 and its bracket 227 as previously described. The universal joints and sliding connections take care of any change of position without in any way necessitating changing of connections between the various shafts.

Sprocket 272 (Fig. 23) will next be considered, it being mounted upon a vertical stub shaft 291 journaled in a boss 209 formed on a plate 210 adjustably clamped on block 251. The line of adjustment between plate 210 and block 251 is longitudinally of the horn 32 and affords a means of tightening the chain 172 between its sprockets 191 and 272. Shaft 291 connects through a universal joint 292, with a sliding shaft 293 carrying a feather 294. Shaft 293 is positioned in a sleeve 295, feather 294 being maintained in a featherway formed in the sleeve the connection insuring uniform rotation between shaft and sleeve while permitting a longitudinal sliding movement. Sleeve 295 connects by a universal joint 296 with a vertical stub shaft 297 journaled within the bearing of a bracket 298 bolted to the wall of housing 78.

Shaft 297 carries a bevel gear 299 which meshes with a similar gear 301 mounted on the shaft 285. Rotation of shaft 285 is thus transmitted to the shaft 291 to rotate the sprocket 272. By reason of universal joints 292 and 296 and the sliding connection between shaft 293 and sleeve 295, vertical and horizontal adjustment of the sprocket 272 can be made without disturbing the relation between the shafts and the driving connection. In this adjustment relative movement between block 251, plate 252 and bracket 253 takes place as previously described.

Horn 32 (Figs. 1, 2, 5, 7, 12 and 18) is provided with opposed longitudinal slots 305 and 306. Chains 171 and 172 carry spaced flights 307 and 308 respectively, and these flights, on the inner run of the chains, travel respectively within the grooves 305 and 306.

The can bodies 33, which are positioned upon the horn 32 by the feed mechanism previously described, are thereby placed in the path of travel of the flights 307 and 308 as the inner run of the conveyor chains 171 and 172 move along the sides of the horn and successive pairs of opposed flights engage behind the rear edges of the can bodies 33 and move them along the horn for the various operations of the machine. A flight 307 is positioned opposite its associated flight 308 on a symmetrical center with the can body and this insures an easy and smooth travel of the can body along the horn 32.

As an advancing can body 33 is picked up by the conveyor chains 171 and 172 and moved from the entrance end of the horn 32, it passes the two entrance end clamping shoes 44 and 47 which separate at the proper time to permit this passage along the horn.

Intermediate the passing of the first and second sets of shoes 44 and 47, the can body traverses the fluxing station at which flux is applied, either to the inside or to the outside of the can body, or to both inside and outside, according to the adjustment of the fluxing mechanism. This mechanism will now be described.

Horn 32 at the fluxing station is recessed at its center to provide a chamber 311 (Figs. 7 and 8) in which is located the device for applying solder to the inside of the passing can body 33. A bracket 312 is clamped to the horn in a longitudinal adjusted position by means of a bolt 313 positioned through a slot 314 cut in the horn 32 and screwed into the bracket, the head of the bolt resting in an outer enlargement of the slot. An arm 315 is pivoted on a pin 316 carried by the bracket 312 and supports a bushing 317 (Fig. 9).

Bushing 317 is threaded in the end of arm 315 and by this connection is laterally adjustable, being clamped in adjusted position by a lock screw 318. A pin 319 formed with a conical head 321 extends inside of bushing 317 being held therein by a nut 322 screwed on its end. A fluxing roller 323 is mounted on and held between the head 321 of pin 319 and a tapered end of bushing 317. Roller 323 for applying flux freely rotates on its mountings and extends through a slot 324 cut in the horn 32 and communicating with the chamber 311.

Arm 315 is provided with an extension 326 (Fig. 8) which, in one position, engages the end of an adjusting bolt 327 threadedly secured in a boss 328 formed on the bracket 312, this construction providing a limit for one position of roller 323. Roller 323 is only used when the can body is to have solder applied to its inner surface and when so used it engages a flux supply roller 371.

Arm 315 carries a depending shoe 329 vertically adjustable therein and held in adjusted position by a screw 331. Shoe 329 is rounded at its lower end and is engaged and lifted by the advancing can body 33, arm 315 pivoting on its pin 316 and lifting roller 323 into flux applying position. The can body 33 continuing along the horn 32 moves beneath the roller 323 which rotates on its mounting and applies to the inside of the can body the flux previously supplied by the flux supply roller 371. This flux supplying operation will be hereinafter fully described.

The can body advancing along the horn engages a flux applying and distributing device 359 which is carried by a bracket 335 adjusted longitudinally in the slot 314 of the horn 32 and is held in its adjusted position by a bolt clamping it to the horn in the same manner as described for the bracket 312. Bracket 335 carries a pin 336 on which is pivotally mounted an arm 337 bent to form a rounded shoulder 338 and carrying a brush 339.

Brush 339 normally rests upon a flux supply roller 372, which will be hereinafter described, and the advancing can body engaging the shoulder 338 of the arm 337, pivots it about its pin 336 raising the brush 339 into flux applying and distributing position. The advancing can body wipes past the brush 339 and receives a further supply of flux on its inside wall and this flux, together with the flux previously applied by the roller 323 is brushed in and evenly distributed.

The fluxed can body then moves beyond the fluxing station, its inner fluxed surface being further engaged by a second flux distributing brush 341 extending beneath the under surface of the horn 32.

Arm 337 is provided with an extension 342 which engages an adjusting screw 343 threadedly secured to a boss 344 carried by the bracket 335 and this construction forms a limit stop for the lowered position of the arm and its brush 339.

A flux pot 351 (Figs. 7 and 8) is located directly beneath the horn 32 at the fluxing station and carries a projection 352 extending from its lower surface which has a tongue and groove connection 353 for engagement with a slide plate 354 (see also Fig. 11). Connection 353 permits lateral adjustment of the pot 351 relative to the plate 354 and the latter is provided with a tongue and groove construction 355 connecting it with the upper end of a bracket 356 carried by the table 37. This permits vertical adjustment of the plate 354 and parts carried thereby relative to the bracket 356 and this adjustment in connection with the adjustment between the parts 352 and 354 give a freedom of adjustment for the flux pot relative to the horn 32.

Plate 354 is held in adjusted position on its bracket by bolts 357 which extend through slots 358 formed in the bracket 356. An easy adjustment between plate 354 and extension 352 is insured by a threaded screw 359 (Fig. 11) turning in an extension 361 formed in the plate 354 and having threaded connection within the projection 352 of the flux pot 351. Screw 359 is rotated by means of a hand-wheel 362 which slides the flux pot 351 along the tongue and groove connection 353 and when the parts are in adjusted position they are clamped together by a bolt 363 extending through a slot 364 formed in the projection 352.

Flux pot 351 (Fig. 7) is adapted to contain liquid flux which is preferably fed to the pot from a supply pipe 365 connected to its bottom, the other end of the pipe connecting with the bottom of an elevated flux tank 366 supported on a bracket 367 projected from one of the columns 38. The flux from the tank 366 flows by gravity through the pipe 365 into the pot 351 and is controlled by a valve 368. By regulation of the valve 368 a predetermined flux level is maintained in the flux pot 351.

Flux is lifted from the supply within the tank 351 by means of rollers 371 and 372 (Fig. 8) rotating partially in the flux and being carried by shafts 373 and 374 rotating within the free ends of arms 375 and 376 respectively pivoted at 377 and 378 to brackets 379 and 381. These brackets are adjustably clamped in position on the flux pot 351 by bolts 382 and 383.

Rollers 371 and 372 (Fig. 8) are positively rotated within the flux which action lifts a uniform amount of flux adhering to their peripheries. For this rotation, there is provided a sprocket and chain device comprising a sprocket 385 secured to the end of shaft 373, and a similar sprocket 386 secured to the end of shaft 374, these sprockets being engaged by a chain 387 passing over idler sprockets 388 and 389 rotating on studs 391 and 392 carried by the flux pot 351. Chain 387 intermediate the sprockets 388 and 389 passes over an idler sprocket 380 rotating on a stud 390 carried by the flux pot. The chain also passes over a drive sprocket 393 rotating on a stud 394 carried by the projection 352. Sprocket 393 is connected with a sprocket 395 (see also Fig. 7) over which passes a link chain 396 operating at its lower end over a sprocket 397 fixed on a horizontal shaft 398 journaled in bearings formed in brackets 399 carried by the table 37.

Shaft 398 (Figs. 1 and 7) carries a bevel pinion 401 which meshes with a bevel gear 402 secured to a shaft 403 journaled in bearings formed in a bracket 404. Shaft 403 carries a sprocket 405 which is engaged by the chain 68 and constantly rotated thereby. This insures the rotation of the flux supply rollers 371 and 372.

Roller 371 (Figs. 8 and 10) is provided with a scraper device for limiting the amount of flux carried up by the roller. This device comprises a scraper blade 411 provided with a slot 412 in which the roller 371 rotates. Blade 411 is secured to an arm 413 extended from a collar 414 clamped in an adjusted radial position on a sleeve forming an integral part of the arm 375.

Provision is made for holding rollers 371 and 372 under spring tension to permit a sufficient yielding action of the rollers as the can body engages them. This also insures that the roller is held against the outside wall of the can body with sufficient force to properly apply the flux thereto. Roller 371 is yieldingly held upwardly by means of a coil spring 421 interposed between a pin 422, projected from the bracket 379 and a pin 423 carried by an extension 424 projected from the arm 375.

Roller 371, upon being depressed, rocks the arm 375 about its pivot 377 against the action of the spring 421. An adjustable stop screw 425 threadedly engaged in the extension 424 strikes against the bracket 379 and limits lifting of the roller 371 by the spring 421.

In a similar manner, roller 372 is yieldingly held in flux applying position by means of a spring 426 interposed between a pin 427 projected from the bracket 381 and a pin 428 projected from an extension 429 forming an integral part of the arm 376. An adjusting screw 431 threadedly engaging within the extension 429, strikes against the bracket 381 and limits the lifting action of the spring 426 on the roller 372.

When roller 323 engages roller 371 and when brush 339 engages roller 372 flux is distributed to the roller 323 and to the brush 339 as previously described. This provides the flux supply for the inside soldering operation. In some cases it may be desirable to solder and flux the can body seam both inside and outside and in that event flux pot 351 and all parts carried thereby are adjusted to position the contact tangent point of rollers 323 and 371 to engage the outside of the passing can body seam.

With such a setting, roller 323 and brushes 339 and 341 apply and distribute the flux on the inside of the passing can body and the rollers 371 and 372 apply the flux on the outside of the seam.

In the event that only the inside wall of the can body is to be soldered, the flux pot 351 and parts carried thereby are adjusted to prevent application of flux to the outside wall of the can body. This is accomplished by lowering the flux pot to a position where the upper edge of the rollers 371 and 372 are beneath the plane of the seam of the passing can body 33. Arms 315 and 337 are allowed to move downwardly to a position where the roller 323 and the brush 339 still engage with their respective rollers 371 and 372, this position being determined by adjustment of the screws 327 and 343. This position is illustrated in Fig. 8.

With the fluxing device so adjusted an advancing can body 33 engages the plate 329 and lifts the roller 323 upwardly into flux applying position. In like manner, arm 337 is engaged by the advancing can body and the brush 339, thereupon, performs its operation. Since rollers 371 and 372 are beneath and out of contact with, the advancing can body, flux will not be placed on the outside of the wall thereof.

In the event that only outside soldering is to be used in connection with the can body 33, the flux pot 351 is adjusted vertically to bring the upper tangent point of rollers 371 and 372 in line with the advancing can body. Adjusting screw 327 is then moved to a position where it holds the arm 315 raised sufficiently to bring roller 323 fully inside of the horn 32 and out of contact with roller 371. In similar manner, the adjusting screw 343 is moved to hold arm 337 raised sufficiently to bring its brush 339 out of contact with the roller 372 and fully inside the horn. With such an adjustment, a passing can body 33 is engaged by the rollers 371 and 372 on the outer wall of its seam and flux is applied thereto. Roller 323 and brush 329 being out of contact with the wall of the can body, no flux is applied to the inside thereof.

By means of the described adjustments for the fluxing operation, it will be evident that the same mechanism may be used for performing different types of fluxing and the desired type may be readily employed with minimum adjustment.

The advancing can body, with its fluxed part, continues in its travel along the horn 32 and passes over a heating element embodying a longitudinal burner 435 (Fig. 1) which preferably employs gas as a heating medium. This gas is supplied in suitable manner to a pipe 436 supporting the burner 435 and held in a bracket 437 carried on a table 438 which constitutes the main support for movable parts of the inside soldering mechanism. Heating of the can body at this point dries the flux prior to passing to the inside soldering mechanism.

Horn 32 at the inside soldering station is partially recessed at its center to provide a chamber 441 (Figs. 12 and 15) in which there is positioned a cage 442 keyed to the horn 32. Cage 442 is provided with a series of partitions 443 enclosing a plurality of chambers 444 in which inside soldering irons are positioned. Each soldering iron comprises a body 445 having a shoulder 446 and a rounded nose 447, the latter projecting into and at times extending through a slot 448 formed in the bottom wall of the horn at this position.

Each iron is supported within the slot 448 and within its chamber 444 by engagement of its shoulder 446 on a bottom wall of the horn 32 adjacent the slot 448. Each soldering iron is provided with spacing pins 449 some of which rest lightly against the wall of the cage 442 while others engage the sides of the slot 448, this construction insuring a floating, substantially frictionless mounting for each iron within its chamber 444. The rounded nose 447 of the iron normally extends below the bottom of the horn but is engaged and the iron lifted by an advancing can body 33. In raised position the iron rides on the inner face of the seam of the can body and deposits and distributes on the can body solder which has previously been applied to the iron by devices hereinafter described.

Provision is made for applying heat to each solder iron 445 when it is in lowered or non-soldering position but this heat is withdrawn during the passing of the can body and the operation of the iron in soldering. A preferred heating medium is gas, which may be introduced into a gas manifold 451 provided with individual burners 452 positioned above and in alignment with each chamber 444. Two manifolds 451 are illustrated, although any convenient number may be used and each manifold is associated with three soldering irons 445. Provision is made for projecting the individual flames from the three burners 452 connected with the first manifold 451 against their individual soldering irons at a different period of time from the projection of the flames to the soldering irons associated with the second manifold 451.

Each manifold 451 (Fig. 12) is carried on the end of a pipe 453 adjustably held in a lever 454 mounted for oscillation on a stub shaft 455 carried by a block 456 threadedly secured to the forward end of an adjustable support rod 457 held in a block 458 (see also Fig. 1) clamped to a horizontal pipe 459. This pipe is supported by a pair of arms 461 mounted on the upper ends of spaced standards 462 carried by bases 463 bolted to one of the I-beams 31.

Provision is made for rocking each pipe 453 with its manifold 451 on its stub shaft 455 and for this purpose the block 454 carrying the pipe is formed with an arm 465 to which is pivotally connected a tie-rod 466 in turn pivotally connected to one arm of a bellcrank lever 467 rocking on a pin 468 carried on an arm 469 surrounding the pipe 459.

The opposite arm of bellcrank lever 467 is pivotally connected by a tie-rod 471 connecting at its lower end with a lever 472 pivoted on a pin 473 projected from a bracket 474 mounted by one of the I-beams 31. Lever 472 carries intermediate its length a cam following roller 475 which engages within a cam groove 476 of a face cam 477 mounted on a horizontal shaft 478 rotating in brackets 479 carried on one of the I-beams 31.

Shaft 478 receives rotation from the power shaft 71 through a clutch mechanism which permits stopping of shaft 478 independently of the power shaft. A sprocket 415 is loosely mounted on shaft 478 (Figs. 1 and 12) and is rotated by operation of a chain 416 passing thereover and over a sprocket 417 fastened on shaft 71. A clutch 418 operated by a hand lever 419 is interposed between shaft 478 and sprocket 415 and provides the manual means for independently controlling movement of the heating devices.

There are two cams 477 one for each manifold 451 and their operations, one being opposed to the other, provide an intermittent action to move the manifold and burners away from and into heat applying position, the latter position being illustrated in Fig. 12. This movement to heat applying position immediately follows the passing of a can body 33 and this results in one manifold 451 being in lowered position when the adjacent manifold is in raised position. When in raised position the flame from its burner 452 is withdrawn from the solder irons and from chambers 444 associated therewith and this permits passing of the can body without having any heat applied to its outer surface as otherwise the can body would have to pass through the flame.

Provision is made for automatically diminishing the flow of gas through a manifold 451 when it is in its raised heat non-applying position. Each pipe 453 is connected, by a flexible hose 485 (Fig. 12), with a vertical gas pipe 486 supported by the arm 469 at its upper end and at its lower end connects with a gas pipe 487 supported on the side of one of the I-beams 31. Pipe 487 constitutes a main service pipe and receives a supply of gas from any suitable source.

A globe valve 488 (see also Fig. 13) is positioned in the pipe line 486 and is provided with a control stem 489 which in one position permits only a diminutive flow of gas through the pipe 486 and into the manifold 451 to provide a pilot light for each burner 452.

An angle plate 491 is secured to the body of the valve 488 and carries a pivot 492 for a bar 493 having slotted connection with the rod 471. As rod 471 is raised to rock its associated manifold into heating position, plate 493 moves about its pivot 492 and engages and depresses the stem 489 of the valve 488. This allows an increased amount of gas to flow through the pipes to the manifold 451 and its burners 452 and a flame of some proportions is directed against its individually associated iron 445. This flame being largely enclosed within its chamber 444, which contains only a single iron 445 is very efficient in heating the iron.

Solder is applied to the face of some of the soldering irons 445 this application being made between the passing of can bodies and at a time when such irons are in their lowermost position with the nose 447 of each iron extending beneath the horn 32. The present embodiment of this feature of the mechanism for inside soldering, as disclosed in detail in Fig. 15, comprises two sets of soldering irons, each set including three irons. A quantity of molten solder is lifted to such of these protruding irons 445 as are to receive solder and their lowermost edges 447 dip beneath the surface of the solder so applied, as will be more fully explained.

While any number of sets of soldering irons may be employed, application of solder will be described as made to the three soldering irons constituting the first set illustrated on the left-hand side of Fig. 15. This application of solder will be made to these three irons immediately following the passage of the can body 33 at which time the other set of irons 445 (on the right-hand side in Fig. 15) will be distributing solder previously applied to the can body by the first set of irons.

Molten solder used for this purpose is contained in a solder pot 495 (Fig. 12) pivotally connected at 496 to the ends of parallel arms 497 and 498 pivoted respectively on shafts 501 and 502 carried in a bracket 503 mounted on the table 438.

Arms 497 and 498 are of equal length and their pivots are equally spaced, these arms constituting a parallelogram system which insures raising and lowering of the pot 495 while maintaining it in a level plane. A link 504 connects the arm 498 to an arm 505 (see also Fig. 14) pivoted on a stub shaft 506 carried on a bracket 507 mounted on the table 438.

Arm 505 is guided at its free end in a slot 508 formed in the bracket 503 and carries a cam following roller 509 positioned intermediate its length. Roller 509 operates in a groove 511 of a face cam 512 carried by a horizontal shaft 513 journaled in bearings formed in brackets 514 mounted on the table 438.

The shape of cam groove 511 is such as to lift arm 505, arms 497 and 498 and the solder pot 495 and this action carries the solder in the pot 495 into contact with the first set of solder irons 445 in proper time with the passing can body 33, as illustrated in Fig. 12.

Shaft 513 (Fig. 14) is rotated by a sprocket and chain connection receiving power from the shaft 71. This comprises a sprocket 515 secured to shaft 513 over which operates a chain 516 also passing over a sprocket 517 secured to a horizontal shaft 518 journaled in bearings formed in brackets 519 carried by the table 438. Shaft 518 carries a sprocket 521 over which operates a chain 522 passing over a sprocket 523 (Fig. 12) secured to the shaft 71. Chain 522 is held taut by a chain tightener device including an idler sprocket 524 (Figs. 1 and 12) mounted on a stub shaft 525 journaled in a bracket 526 having a tongue and groove connection (for adjustment purposes) with a plate 527 mounted on one of the rails 91.

Solder pot 495 is heated to maintain its solder in a proper molten condition by a gas burner 531 (Fig. 12) positioned directly beneath the pot and supported on a bracket 499 extending therefrom. Burner 531 is adapted to receive a supply of gas from a pipe 532 with which it is connected.

An automatic solder feeding device is provided for maintaining a constant level of solder within the solder pot 495. This feeding device comprises associated frictional rollers 533 and 534 (Figs. 12 and 16) the latter being mounted on a shaft 535 journaled in a bracket 536 carried on the table 438, roller 533 being mounted on a pin 537 carried by an arm 538 of a bellcrank lever 539 pivoted at 540 on the bracket 536. Lever 539 carries a counter balance weight 529 which tends to urge roller 533 toward roller 534 and to frictionally engage a strip of wire solder 541 positioned therebetween.

This wire solder 541 (Figs. 12 and 16) received from any suitable source of supply is moved through a tube 542 carried by a bracket 543 mounted on the bracket 536. The solder 541 leaving the upper end of tube 542 and passing between rollers 533 and 534 is further conveyed through a tube 544 which is mounted on a bracket 545 carried by the bracket 536 and which projects over the rim of the solder pot 495 and above the upper surface of the solder contained therein.

The feed rollers 533 and 534 are intermittently rotated to move the solder wire 541 through the tubes 542 and 544 and into the molten solder of the solder bath. The forward end of this wire solder upon moving against the surface of the molten solder within the pot 495 itself becomes molten and mingles with the solder in the pot. The weighted bellcrank 539 holds the roller 533 with sufficient friction against the solder wire passing between it and its associated roller 534 to insure proper feeding action.

Roller 533 (Figs. 1 and 16) is formed integrally with a spur gear 546 which meshes with a similar gear 547 formed as an integral part of roller 534. This insures uniform rotation of the two rollers for proper feeding action. Shaft 535 which carries roller 534 extends beyond one side of its bearing in bracket 536 and carries at its outer extremity a ratchet wheel 549. A lever 551 (see also Fig. 12) is loosely mounted on shaft 535 intermediate the end of its bearing and the wheel 549, and pivotally supports at its upper end a pawl 552 which rests above and engages the toothed periphery of the ratchet wheel 549. Owing to the shape of the teeth of wheel 549 and the position and shape of pawl 552, the latter engages a tooth of and rotates the wheel 549 with its shaft 535 when the lever 551 is rocked in one direction.

Lever 551 is pivotally connected at its lower end to a link 553 (Figs. 12, 14 and 16) which, in turn, is pivotally connected to a sliding block 554. Block 554 has radial movement within a slot 555 formed in the face of a crank disc 556 carried on a horizontal shaft 557 journaled for rotation in a bracket 558 mounted on table 438 and in a bearing 559 projected from the bracket 536. Shaft 557 carries a sprocket 561 over which operates a chain 562 passing over a sprocket 563 carried on the shaft 518.

Rotation of shaft 557 through the described connections causes a rocking of lever 551 and this moves the pawl 552 back and forth. When pawl 552 moves in one direction, it engages a tooth of the ratchet wheel 549 and rotates the wheel and its shaft 535 together with the rollers 534 and 533 which action advances the wire solder 541 a given amount. As pawl 552 is carried in a reverse direction, its forward end lifts up and moves over the teeth of the ratchet wheel 549 and no movement is transmitted to the wheel.

The amount of wire solder 541 fed into the solder pot 495 at each partial rotation of the feed rollers 533 and 534 is determined by the amount of travel of the pawl 552 when in engagement with a tooth of the wheel. This amount of throw is regulated by shifting the block 554 and the pivotal connection of the link 553 (Figs. 12 and 14) along the slot 555 of the crank disc 556. As this pivot point is brought nearer to the center of shaft 557 the amount of movement transmitted to the lever 551 by rotation of the crank disc 556 is decreased and as the pivot point is moved away from the center, this rocking movement of lever 551 is increased.

The solder pot 495 and its associated mechanism together with the automatic solder feeding device just described are carried on the table 438. Provision is made for moving this table to carry the devices out of soldering position. Table 438 carries a series of casters 565 (Figs. 1 and 12) in which caster rollers 566 are carried. Two spaced trough members 567 extend transversely above and connect the rails 91 and table 438 is adapted to move thereover, the trough members forming channel tracks for the rollers 566.

When it is desirable to dispense with the inside soldering operation the bracket 526, which carries the chain tightener sprocket 524, is loosened from its connection with plate 527 and is slid back to remove the sprocket from its chain 522. Table 438 is thereupon rolled away from horn 32 and out of soldering position, this movement being accomplished by means of a horizontally threaded rod 568 rotating freely in a bracket 569 secured to one of the outer rails 91. Rod 568 has threaded connection with a boss 571 projected downwardly from table 438 and rotation of the rod within the boss 571 effects this movement. The head 572 of the rod 568 is properly shaped to permit application of a wrench or other turning tool.

With table 438 and the parts carried thereby in non-operative position, no inside soldering is effected on a passing can body, the soldering irons 445 being engaged and lifted by the can body in the regular manner without effecting any operation thereon.

After a can body 33 (Fig. 1) has moved over the first set of soldering irons and has engaged the second set, the body passes over a gas manifold 573 screwed to the upper end of a pipe 574 held in a boss 528 projecting from bracket 216. This manifold is provided with a plurality of burners and is connected with a suitable source of gas supply. This heating element raises the temperature of can body 33 as it passes and gives the can a "sweat" for the solder just applied or if subsequent soldering is to be done raises it to proper soldering temperature.

Figure 17:
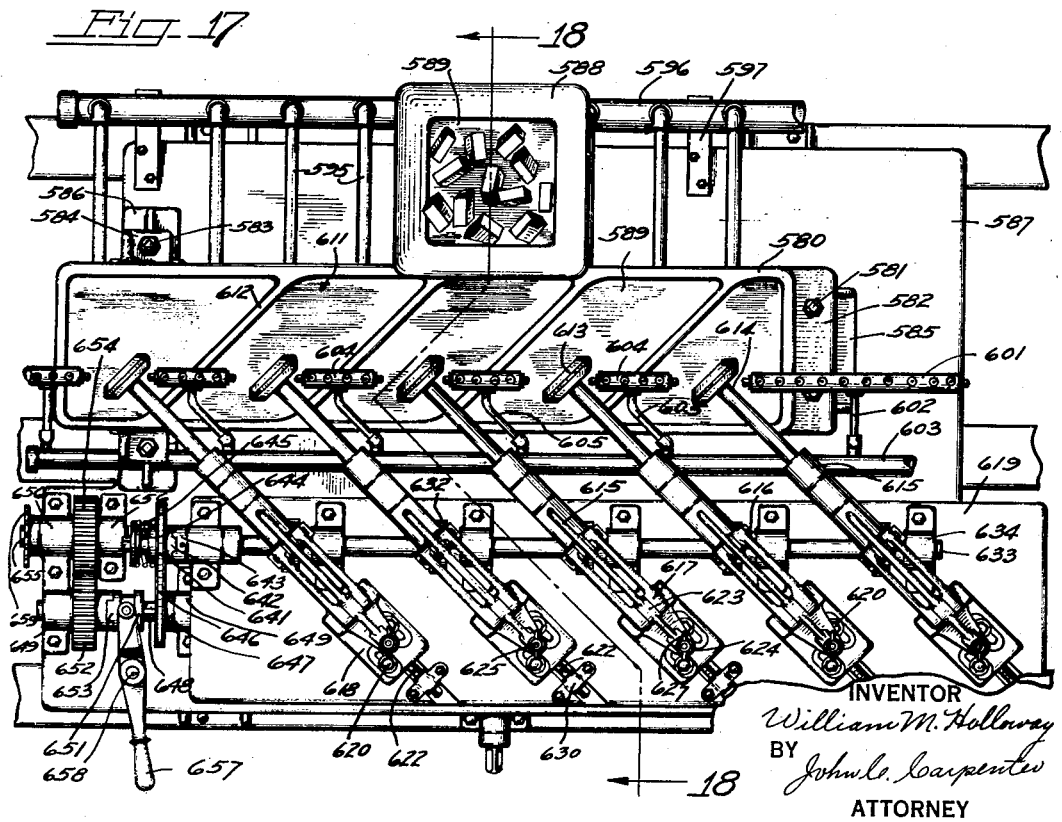
Fig. 17 is a top plan of the outside soldering mechanism, parts being broken away.

A can body 33 after passing the inside soldering station enters the zone of outside soldering instrumentalities, these applying solder to the exterior wall of the passing can body as it is being conveyed along horn 32 by the chain conveyors 171 and 172. For this purpose, there is provided a solder basin 580 adapted to contain solder, this basin and contents constituting a solder bath (Figs. 2, 17 and 18). This solder bath 580 carries vertical screws 581 threaded through a flange 582 projected from one end of the bath and screws 583 threaded through flanges 584 projected from the side walls of the bath at its opposite end.

Screws 581 rest upon the upper end of a bracket 585 and each screw 583 rests upon the top of a bracket 586. Bracket 585 and brackets 586 are carried on a table 587 on which the entire outside soldering mechanism is carried. Solder bath 580 by proper adjustment of the screws 581 and 583 may be raised or lowered for proper height and position and may be brought to correct level.

A premelting pot 588 is used for melting the solder prior to its introduction into the solder bath and this provides a solder supply in which lumps of cold solder may be placed from time to time as needed. Pot 588 is secured to the solder bath 580 adjacent one side. Solder 589 brought to a molten condition within the pot 588 flows through registering openings 591 and 592 formed respectively in the adjacent walls of pot and bath and these openings communicate with the interior of the bath 580.

A series of gas burners 593 are positioned beneath the solder bath 580 and are enclosed within a pan 594 carried by the solder bath 580. Each burner 593 is connected by a pipe 595, with a gas manifold 596 supported on straps 597 carried on the table 587.

A similar heating means for the premelting pot 588 is provided in a gas burner 598 positioned therebeneath and connected by a pipe 599 with the gas manifold 596. By means of the burner beneath the premelting pot and the burners positioned below the solder bath, the solder 589 within the pot and bath is maintained in molten condition.

A can body 33 conveyed along the horn 32 adjacent the outside soldering zone, when this mechanism is in soldering position, passes over a multiple gas burner 601 (Fig. 17) positioned adjacent and in line with the burner 573. Burner 601 is connected by a pipe 602 with a gas manifold 603. Throughout the continued passage of the can body over the solder bath 580, the same is further heated by a series of multiple burners 604 each connected by pipe 605 with the gas manifold 603, these burners being at spaced positions over the solder bath 580 and along the path of travel of the can body. These manifolds 596 and 603 receive gas from any outside suitable source.

Solder bath 580 is broken up into a series of individual baths 611 (Figs. 17 and 18) by partition plates 612 arranged between the side walls of the solder basin and extending at an angle therewith. Plates 612 extend only a short distance below the level of solder 589 within the bath 580 and all of the individual baths 611 are in direct communication with each other beneath these partitions.

The instrumentalities for applying the solder to the passing can bodies throughout this outside soldering zone embody solder applying rollers 613 so mounted and operating as to lift a film of solder from the bath and to apply it to the passing can bodies these rollers rotating at an angle to the line of travel of the bodies. A single roller 613 is associated with each individual solder bath 611 and each roller 613 is secured to the end of a substantially horizontal shaft 614 mounted in a movable bracket 615 pivoted on a pin 616 carried by an extension 617 projected from a bracket 618 supported on an auxiliary table 619 having legs 621 carried upon and secured to the table 587.

Each bracket 618 (Figs. 17 and 18) is adjustably secured to the table 619 being slotted to permit movement relative to cap screws 620, which, when screwed down, hold the bracket on the table. An adjusting screw 622 having threaded connection with the bracket 618 rotates freely in a bracket 630 carried on the table 619 and provides a spacing means for adjusting the position between the brackets 618 and 630. This adjusting movement shifts the shaft 614 longitudinally and affords an alignment feature for individual adjustment of each roller 613 relative to the horn 32.

The various rollers 613 each with their shafts 614 and brackets 615 and 618 are arranged in parallel relation one with the other and are so spaced as to position each roller between adjacent burners 604. These parallel shafts 614 and brackets 615 extend at an angle of approximately 45 degrees with the line of travel of the can body and this insures an angular contact for each roller 613 with the can body and results in an angular line of solder application accompanied by a wiping action on the can seam.

The solder applied to the exterior wall of the passing can body by each roller wiping into its seam is immediately reheated by the burner 604 next in the line of travel. The next adjacent solder roller 613 then performs its soldering operation, immediately followed by another reheating and this action continues throughout the travel of the can body over the solder bath 580.

In order to insure proper lifting of solder by each solder roller 613 (Figs. 17 and 18), these rollers extend a slight distance beneath the level of the molten solder contained in the solder bath 580 and are held in proper position by their brackets 615. Each bracket 615 is provided with an arm 623 which extends between spaced walls of the extension 617. The end of arm 623 is slotted as at 624 and a vertical screw 625, held in threaded adjustment on a projection 626 carried by bracket 618, extends upwardly through the slot 624.

Screw 625 is provided with a head or thumb nut 627 which confines a coil spring 628 which is positioned on the screw 625 and interposed between the head 627 and the end of the arm 623. A limit screw 629 is held in adjusted and threaded position within the projection 626 and extends upwardly to engage the under-surface of the arm 623.

Spring 628 normally holds the arm 623 in its adjusted lower position in contact with the screw 629 and holds bracket 615 in a predetermined position insuring proper vertical position of the roller 613 but this yielding connection permits depression of the roller and provides a slight frictional contact with the can body in the soldering operation. During depression of roller 613, bracket 615 moves about its pivot 616 against the action of the spring 628. This yielding connection also provides a safety device permitting the roller 613 to be moved out of the way of a passing can body should it, for any reason, become distorted.

Each roller 613 (Figs. 2, 17 and 18) is rotated with its shaft 614, the shaft carrying at one end a spiral gear 631 which meshes with a similar gear 632 carried on a horizontal shaft 633 journaled for rotation in brackets 634 located on the auxiliary table 619. Shaft 633 extends practically the entire length of the outside soldering mechanism and carries a gear 632 for each shaft 614 and roller 613.

Shaft 633 is connected by means of a slip clutch with a driving shaft, the slip clutch device comprising a sprocket 641 having a tongue and groove connection 642 with a collar 643 secured to one end of the shaft 633. Sprocket 641 has sliding movement on the end of shaft 633 and is held in clutched or locked position with the collar 643 by a coil spring 644 surrounding the end of shaft 633 and interposed between the sprocket 641 and a washer 645 bolted to the end of the shaft 633. Spring 644 is of sufficient strength to normally hold sprocket 641 in this locked position and the shaft 633 at such time rotates with the sprocket 641.

In the event, however, of a blocking of the shaft 633, the rotating sprocket 641 slides back on the shaft against the action of the spring 644 and disconnects at the tongue and groove 642. This provision is made to prevent damage to the machine in the event that an attempt is made to rotate the shaft 633 when the solder within bath 580 is solidified or of insufficient fluidity to permit easy turning of the rollers 613 therein.

Sprocket 641 (Figs. 17 and 18) is driven by a chain 646 which passes over the sprocket 641 and over a sprocket 647 secured to a stub shaft 648 journaled for rotation in bearings formed in brackets 649 mounted on the table 587. Shaft 648 carries a clutch collar 651 which is splined to the shaft and has sliding movement thereon and this collar is normally connected with a gear 652 by a tongue and groove connection 653. Gear 652 is loosely mounted on the shaft 648 and meshes with a gear 654 secured to a shaft 655 journaled for rotation in brackets 656.

A hand control lever 657 is pivoted on a vertical pin 658 carried by the table 587 and has connection with the collar 651. Operation of the handle 657 slides the collar on its splined shaft 648 and engages or disengages the gear 652 at the connection 653.

Shaft 655 carries a sprocket 659 (Figs. 2, 17 and 18) over which operates a chain 661, in turn passing over a sprocket 662 carried by the shaft 71. It will be evident that rotation of shaft 71 through the described connecting parts rotates the shafts 614 and their solder applying rollers 613.

When the outside soldering operation is not desired the clutch handle 657 is moved to disconnect driving power to the shaft 648 and the rollers 613 thereupon cease to rotate within their individual solder baths 611. Provision is also made for removing the entire outside soldering mechanism from operating position beneath the horn 32, this being accomplished by a shifting of the table 587.

Table 587 carries a series of casters 666 (Fig. 18) in which caster rollers 667 are carried. A pair of spaced trough members 668 extend above and connect the rails 91 and table 587 is adapted to move thereover, the trough members forming channel tracks for the rollers 667.

To assist in this shifting of the table 587, there is provided a horizontal, threaded rod 671 freely rotatable in a bracket 672 carried by one of the rails 91. Rod 671 has threaded engagement with a boss 673 projected downwardly from the table 587 and rotation thereof within its boss 673 effects this movement. A head 674 of the rod 671 is properly shaped to permit application of a wrench or other turning device.

In the event that an outside soldering operation has been performed upon a can body 33 conveyed along the horn 32, the exterior wall of the can body which has received its solder is further engaged by a wiping device. This device removes the excess solder from the exterior of the can body and wipes the same into its seam. Reference should now be had to Fig. 2 and to Figs. 19 to 22 inclusive.

The entire wiping mechanism is supported on a frame 681 provided with a base 682 having tongue and groove connection 683 with a plate 684 extending across and bolted to the rails 91. Frame 681 is adjusted transversely of the machine by movement along its connection 683 and is held in adjusted position by a clamping bolt 685 provided with a head 686 movable longitudinally of slots 687 and 688 cut in the plate 684. Bolt 685 passes through the base 682 and is engaged by a lock nut 689 which draws the bolt head against the plate 684 and this holds the frame 681 in adjusted position.

Frame 681 carries a frame 691 and a gear housing 692 on and in which the operating parts of the wiper mechanism are carried. Bearings 693 (Figs. 19, 20 and 21) are formed in the frame 691 and carry a shaft 694. A bifurcated lever 695 is positioned on shaft 694 on opposite sides of one of the bearings 693 and is formed at one end as a boss 696 which constitutes a bearing for a shaft 697 which carries a rotary wiper 698. Wiper 698 is positioned directly beneath the line of travel of the soldered seam of the can body 33 as it is conveyed along the horn 32 and rotates in the plane of travel of the can body.

Shaft 697 is continuously rotated by means of a gear connection, comprising a spur gear 699 secured to the shaft and meshing with an intermediate gear 701 secured to a shaft 702 journaled in a bearing 703 formed in the lever 695. Gear 701, in turn, meshes with a gear 704 carried by the shaft 694. Shaft 694 (Fig. 19) extends within the gear housing 692 and carries a gear 705 which meshes with a gear 706 located in the housing 692 and secured to a shaft 707 journaled in bearings 708 formed in the frame 691.

Gear 706 is formed integrally with a bevel gear 709 which meshes with a gear 711 keyed to a shaft 712 rotating in bearings formed in the gear housing 692. Shaft 712 carries a sprocket 713 (Figs. 2 and 20) over which operates a chain 714 passing over a sprocket 715 carried by the power shaft 71. Rotation of the shaft 71 through the described sprocket, chain and gear connections constantly rotates the wiper 698.

An adjustment is provided for insuring a given vertical position of the wiper 698 relative to the passing can body 33 on the horn 32. This adjustment is applied to the lever 695 and comprises a screw 716 threaded in a lug 717 (Figs. 20 and 21) projected from the lever 695. Screw 716 is provided with a head 718 which permits convenient rotation thereof. The lower end of screw 716 normally rests upon a shelf 719 projected from one of the bearings 693 of the frame 691.

That end of lever 695 containing the adjusting screw 716 is connected by a link 721 with a weight 722. Weight 722 tends to hold the lever 695 in its normal position determined by the screw 716 where it positions wiper 698 for a proper wiping contact with the passing can body 33. The position of lever 695 may be altered by a different setting of screw 716, this providing an exact locating device for the wiper.

Shaft 726 is driven in unison with shaft 707 by a chain and sprocket connection comprising a sprocket 729 secured to shaft 726 and a sprocket 731 secured to shaft 707, these sprockets being connected by a chain 732. The size of these sprockets together with the described gearing for shafts 694 and 707 causes a rotation of the roller 725 at a different peripheral speed from the wiper 698. Roller 725 is held in contact with the wiper 698 by mechanism now to be described and by reason of their differences in peripheral speeds, solder adhering to the wiper is carried off by the roller. Roller 725, in turn, is maintained in proper condition by a scraper device comprising a plate 733 contacting and partially enclosing the roller 725 at its bottom edge, the plate 733 being mounted on an arm 734 projected from the bearing 727 (Figs. 19 and 20).

In the event that the can body 33 passing along horn 32 is being soldered only on the inside, wiper 698 is not needed and it is moved by adjustment of the screw 716 out of contact with the advancing can body. This yielding mounting of the wiper 698 also provides a safety device permitting depression of the wiper without injuring the wiping mechanism.

Provision is made for removing solder from the wiper permitting it to present to the passing can body a clean wiping surface. A crowned roller 725 is positioned directly beneath the wiper 698 and is mounted on a shaft 726 (Fig. 19) which is journaled in a bearing 727 formed as an integral part of arms of a bifurcated lever 728, (see also Figs. 20 and 22). Lever 728 is mounted on shaft 707 its arms being positioned on opposite sides of one of the bearings 708.

Roller 725 is held in spaced relation to the wiper 698 and preferably provides a mere contact therebetween. Bearing 696 carries projecting lugs 735 (Figs. 19, 20 and 21) which support a pin 736 on which is pivotally mounted an eyebolt 737 extending downwardly and passing through an opening formed in a projection 738 (Figs. 20 and 22) formed as a part of the bearing 727. A coil spring 739 is positioned on the bolt 737 intermediate the lugs 735 and the projection 738 and the bolt carries a nut 741, this construction providing an adjustment between shaft 697 and shaft 726, spring 739 at all times tending to separate these shafts and the wiper 698 and roller 725.

Wiper 698 is preferably formed of laminated discs of fabric, or other suitable material, tightly clamped together. As these discs wear adjustment is made to keep the roller 725 at a proper distance from the wiper 698 by changing the position between shafts 697 and 726, nut 741 at such time being turned on its threaded connection with bolt 737.

After can body 33 has passed the wiping station, it passes the two sets of horn supporting members 102 and 105, which operate, as previously described, to alternately permit the passage of the can body.

Intermediate the two sets of members just mentioned a roller 745 (Fig. 2) is located and the soldered seam of the passing can body engages and rotates this roller. Roller 745 is mounted on a shaft 746 resting in notches 747 formed in the side walls of a tank 748 mounted on a bracket 749 carried by the plate 96. The notches 747 form bearings for the roller and shaft which freely rotate therein. The tank 748 is adapted to contain cold water and roller 745 partially rotates therein and lifts and applies a film of water to the seam of the can body, thereby cooling the soldered joint. The can body upon reaching the end of the horn 32 discharges from the machine.

It will be evident from the preceding description that the machine of the present invention is adjustable for different sizes and shapes of can bodies, a different shape and size of horn being substituted for a different cross section of can body. By reason of the adjustments connected with all of the apparatus of the various operating stations and the mechanism for holding the horn in position, complete and accurately positioning of the parts relative to a horn is easily and efficiently made. By reason of the described adjustments, the various operating units may be individually controlled and positioned irrespective of the operation of adjacent units. Every can body passing into the machine makes the complete passage therethrough along the entire length of the horn 32 and the type of operations performed upon the can body during this passage is determined entirely by the control of the various operating units.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a soldering apparatus, the combination of a horn, devices for feeding a can body along said horn, said can body having a side seam adapted to be soldered, and a plurality of sets of soldering instrumentalities, one set for automatically soldering the inner face of said side seams from within the container body during its passage along said horn, and a second set for automatically soldering the outer face of the same side seam during the same passage of the container along said horn, means for fluxing the seam externally, means for fluxing the seam internally, and devices for adjusting either fluxing means to inoperative position leaving the other fluxing means in operative position.

2. In a soldering apparatus, the combination of a horn, devices for feeding a can body along said horn, said can body having a side seam adapted to be soldered, and a pair of sets of soldering instrumentalities, arranged along said horn in successive order, one set for automatically soldering the inner face of said side seam from within the container body during its passage along said horn, and a second set for automatically soldering the outer face of the same side seam during the same passage of the container along said horn, means for fluxing the seam externally, means for fluxing the seam internally, and devices for adjusting either fluxing means to inoperative position leaving the other fluxing means in operative position.

3. In a soldering apparatus, the combination of a horn, devices for feeding a can body along said horn, said can body having a side seam adapted to be soldered, a plurality of sets of soldering instrumentalities, one set for automatically soldering the inner face of said side seams from within the container body during its passage along said horn, and a second set for automatically soldering the outer face of the same side seam during the same passage of the container along said horn, and means for selectively moving a set of said soldering instrumentalities out of operative position relative to said horn.

4. In a soldering apparatus, the combination of a horn adapted to receive thereover a succession of can bodies spaced apart, devices for feeding a can body along said horn, said can body having a side seam adapted to be soldered, and a plurality of sets of soldering instrumentalities, one set for automatically soldering the inner face of said side seam from within the container body during its passage along said horn, and a second set for automatically soldering the outer face of the same side seam during the same passage of the container along said horn, means for fluxing the seam externally, means for fluxing the seam internally, and devices for adjusting either fluxing means to inoperative position leaving the other fluxing means in operative position.

5. In a soldering apparatus, the combination of a frame, a horn adapted to receive thereover a succession of can bodies spaced apart, devices for feeding said can bodies, means for supporting said horn on said frame to permit the free passage of the can bodies therealong, and a plurality of sets of soldering instrumentalities arranged along said horn for soldering parts of said can bodies, means for fluxing the seam externally, means for fluxing the seam internally, and devices for adjusting either fluxing means to inoperative position leaving the other fluxing means in operative position.

6. In a soldering apparatus, the combination of a frame, a horn adapted to receive thereover a succession of can bodies spaced apart, devices for feeding said can bodies, means for supporting said horn on said frame to permit the free passage of the can bodies therealong, and a plurality of sets of soldering instrumentalities mounted on said frame and arranged along said horn for soldering the same seam of said can bodies interiorly and exteriorly thereof during the same passage of the can bodies along the horn, means for fluxing the seam externally, means for fluxing the seam internally, and devices for adjusting either fluxing means to inoperative position leaving the other fluxing means in operative position.

7. In a soldering apparatus, the combination of a frame, a horn adapted to receive thereover a succession of can bodies spaced apart, devices for feeding said can bodies, means for supporting said horn on said frame to permit the free passage of the can bodies therealong, a plurality of sets of soldering instrumentalities having heating means mounted on said frame and arranged along said horn for soldering the same seam of each of said can bodies interiorly and exteriorly thereof during the same passage thereof along the horn, and means for selectively moving a set of said soldering instrumentalities relative to said frame and out of operative position relative to said horn.

8. In a soldering apparatus, the combination of a frame, a horn adapted to receive thereover a succession of can bodies spaced apart, devices for feeding said can bodies, means for supporting said horn on said frame to permit the free passage of the can bodies therealong, a plurality of sets of soldering instrumentalities adapted to perform different kinds of soldering on said can bodies, a heat-regulating shaft common to all of the sets of said instrumentalities, and means for preventing a kind of soldering operation by rendering inoperative a said set of soldering instrumentalities and leaving operative another of said sets.

9. In a soldering apparatus, the combination of a horn adapted to receive thereover a succession of can bodies spaced apart, devices for feeding can bodies along said horn, soldering instrumentalities arranged along said horn, a said instrumentality adapted to apply solder to the inside of a passing can body and a different instrumentality adapted to apply solder to the corresponding outside portion of a can body during the same passage thereof along the horn, and means for operating said instrumentalities, means for fluxing the seam externally, means for fluxing the seam internally, and devices for adjusting either fluxing means to inoperative position leaving the other fluxing means in operative position.

10. In a soldering apparatus, the combination of a horn adapted to receive thereover a succession of can bodies spaced apart, devices for feeding can bodies along said horn, soldering instrumentalities arranged along said horn, a said instrumentality adapted to apply solder to the inside of a passing can body and a different instrumentality adapted to apply solder to the outside of the same portion of a passing can body during the same passage thereof along the horn, and means for individually and selectively operating one or more of said instrumentalities.

11. A soldering apparatus comprising in combination, a horn having free ends and adapted to receive thereover a succession of can bodies spaced apart, devices for feeding can bodies along said horn, means for supporting said horn to permit uninterrupted passage of the can bodies thereover whereby they are received over the front end of said horn and discharged from the rear end, and devices for feeding said can bodies over said front end, means for fluxing the seam externally, means for fluxing the same seam internally during the same passage of said bodies along the horn, and devices for adjusting either fluxing means to inoperative position leaving the other fluxing means in operative position.

12. A soldering apparatus comprising in combination, a horn having free ends and adapted to receive thereover a succession of can bodies spaced apart, opposed feed chains arranged on opposite sides of said horn and engaging the can bodies for feeding the same along said horn, means for supporting said horn to permit uninterrupted passage of the can bodies thereover whereby they are received over the front end of said horn and discharged from the rear end, means for soldering the internal and external surfaces of the same parts of can bodies during the same passage thereof along the horn, and devices for feeding said can bodies over said front end and means for adjusting either of said chains relative to the horn.

13. In a soldering apparatus, the combination of a horn having free extremities, means for passing hollow can bodies over one end of the horn feeding them therealong and discharging them from the opposite end of said horn, a plurality of sets of radially movable upper and lower opposing plungers having clamping jaws mounted in spaced relation longitudinally of the horn, means for automatically operating said plungers in timed relation with the passage of the can bodies along the horn to cause said clamping jaws to successively engage and withdraw from said horn whereby said horn is held in a predetermined plane, and adjusting means for changing the clamping position of said jaws to hold said horn in a different plane.

14. In a soldering apparatus, the combination of a horn adapted to receive a succession of can bodies thereover spaced apart, means for transporting the can bodies therealong, a reservoir of fluxing material positioned beneath said horn, flux applying and distributing members mounted inside said horn for providing said can bodies with flux during their passage along said horn, and means for transferring flux from said reservoir to said members within the spaces between said passing can bodies, and means for adjusting said members and said transferring means for applying flux only to the inside or to the outside of the can bodies.

15. In a soldering apparatus, the combination of a horn, devices for feeding a can body along said horn, said can body having a side seam adapted to be soldered, a plurality of sets of soldering instrumentalities, one set for automatically soldering the inner face of said side seam from within the container body during its passage along said horn, and a second set for automatically soldering the outer face of the same side seam during the same passage of the container along said horn, and a fluxing mechanism comprising devices for applying flux to the inner face of said side seam and devices for applying flux to the outer face thereof.

16. In a soldering apparatus, the combination of a horn, devices for feeding a can body along said horn, said can body having a side seam adapted to be soldered, a plurality of sets of soldering instrumentalities, one set for automatically soldering the inner face of said side seams from within the container body during its passage along said horn, and a second set for automatically soldering the outer face of the same side seam during the same passage of the container along said horn, a fluxing mechanism comprising devices for applying flux to the inner face of said side seam and devices for applying flux to the outer face thereof, and means for adjusting said mechanism for selectively operating one or the other of said flux applying devices.

17. In a soldering apparatus, the combination of a horn adapted to receive a can body, means for transporting the can body therealong, a fluxing mechanism positioned adjacent the travel of the can body and comprising inside flux applying members mounted inside said horn and outside flux applying members exterior of said horn, and means for selectively adjusting said members relative to the passing can body whereby the inside or the outside flux applying members are positioned to apply flux to said can body.

18. In a soldering apparatus, the combination of a horn adapted to receive a can body, means for transporting the can body therealong, a fluxing mechanism positioned adjacent the travel of the can body for applying flux thereto and having means for applying flux both outside and inside the can body, soldering instrumentalities arranged along said horn for soldering the passing can body on its fluxed surface, heating means positioned after the flux applying mechanism and before the soldering instrumentalities for drying said fluxed surface.

19. In a soldering apparatus, the combination of a horn adapted to receive a succession of can bodies thereover, means for transporting the can bodies therealong, a soldering instrumentality comprising parts arranged along said horn and irons and intermediate partitions mounted in said horn for soldering the passing can bodies, and means for moving said first mentioned parts of said instrumentality from its operative position adjacent said horn to an inoperative position without interfering with said can body movement.

20. In a soldering apparatus, the combination of a horn adapted to receive a succession of can bodies thereover, means for transporting the can bodies therealong, a soldering instrumentality comprising a plurality of soldering irons mounted on said horn and adapted to solder the inner and outer walls of the same side seam of each of said can bodies during the same passage thereof along the horn, means for automatically applying solder to said soldering irons, and individual heating means for each iron for heating the same, said heating means being constructed and arranged and having means for removing them from heating relation with respect to said irons during the passage of the can body along said horn.

21. In a soldering apparatus, the combination of a horn adapted to receive a can body thereon, means for feeding the can body therealong, a soldering iron mounted on the horn and adapted to solder the inner and outer walls of the same side seam of the can body during the same passage thereof along the horn, means within the horn for heating the soldering iron, and devices for simultaneously and automatically diminishing the heat and withdrawing it from the iron during the soldering operation.

22. In a soldering apparatus, the combination of a horn adapted to receive a succession of can bodies thereover, means for transporting the can bodies therealong, a soldering instrumentality comprising a plurality of soldering irons mounted on said horn and adapted to solder the inner walls of the side seams of said can bodies, a solder receptacle mounted beneath said soldering irons for containing a supply of solder, means for automatically applying solder from said receptacle to said soldering irons, heating means for supplying a constant heat to said solder receptacle to maintain its solder in a molten condition, and intermittently acting means within the horn for supplying an intermittent heat to said soldering irons to maintain them in soldering condition.

23. In a soldering apparatus, the combination of a horn adapted to receive a can body thereon, means for feeding the can body therealong, soldering irons positioned along said horn and adapted to solder said can body during its passage along the horn, automatically intermittent gas flame heating means for said irons, a solder receptacle mounted adjacent said soldering irons for containing a supply of solder, means for applying solder from said receptacle to said soldering irons, feeding devices for feeding solder to said receptacle, and means for regulating the amount of solder so fed.

24. In a soldering apparatus, the combination of a horn adapted to receive a succession of can bodies thereover, means for transporting the can bodies therealong, a soldering instrumentality arranged along and under said horn for applying solder to the outside of the passing can bodies, and means for moving said instrumentality from its operative position adjacent said horn to an inoperative position without interfering with said can body movement.

25. In a soldering apparatus, the combination of a horn adapted to receive a succession of can bodies thereover, means for transporting the can bodies therealong, and a soldering instrumentality arranged along and under said horn for applying solder to the outside of the passing can bodies, said instrumentality comprising a plurality of parallel, spaced, rotary soldering irons, and means for holding said irons yieldingly against said can bodies.

26. In a soldering apparatus, the combination of a horn adapted to receive a succession of can bodies thereover, means for transporting the can bodies therealong, a soldering instrumentality arranged along said horn for applying solder to the outside of the passing can bodies, said instrumentality comprising a plurality of parallel, spaced, rotary soldering irons yieldingly held in the path of travel of said can bodies, and power mechanism connected with their axes for rotating said soldering irons.

27. In a soldering apparatus, the combination of a horn adapted to receive a succession of can bodies thereover, means for transporting the can bodies therealong, a soldering instrumentality arranged along said horn for applying solder to the outside of the passing can bodies, said instrumentality comprising a plurality of parallel, spaced shafts mounted for rotation beneath said horn and at an angle to the line of travel of said can bodies, and a rotary soldering iron secured to and movable with each of said shafts, and means for rotating said shafts.

28. A soldering apparatus comprising in combination, a horn adapted to receive a succession of can bodies thereover, means for transporting the can bodies therealong, a solder receptacle mounted adjacent said horn and adapted to contain a supply of solder, a solder shaft pivotally mounted above said receptacle, a rotary soldering iron carried by said shaft and moving within the solder in said receptacle for transferring solder from said receptacle to a passing can body, and means for yieldingly holding said shaft on its pivot to place said rotary soldering iron in proper soldering position.

29. In a soldering apparatus, the combination of a horn, devices for feeding a can body along said horn, said can body having a side seam adapted to be soldered, a soldering instrumentality for applying solder to said side seam, and a wiper mechanism for wiping the applied solder into the seam of said can body, said wiper mechanism comprising a lever pivoted beneath said passing can body, a circular wiper rotatably mounted on said lever, weighted means for holding said wiper in seam wiping position, adjustable means for limiting the movement of said lever, and means for rotating said wiper.

30. In a soldering apparatus, the combination of a horn, devices for feeding a can body along said horn, said can body having a side seam adapted to be soldered, a soldering instrumentality for applying solder to said side seam, and a wiper mechanism for wiping the applied solder into the seam of said can body, said wiper mechanism comprising a lever pivoted beneath said passing can body, a circular wiper rotatably mounted on said lever, weighted means for holding said wiper in seam wiping position, a rotary scraper engaging said wiper for removing excess solder therefrom and interconnected means for rotating said wiper and said scraper.

31. A soldering apparatus comprising in combination, a horn, means for supporting said horn in a predetermined position, devices at the sides of said horn for feeding can bodies along said horn, instrumentalities for applying solder to said can bodies, adjusting means associated with said supporting means for altering the predetermined position for said horn, and adjusting means associated with said feeding devices for changing their positions to properly coordinate with the changed position of said horn.

32. A soldering apparatus comprising in combination, a horn, means for supporting said horn in a predetermined position, devices for feeding can bodies along said horn, fluxing devices for applying flux to said can bodies, instrumentalities for applying solder to said can bodies, heating means for heating said instrumentalities and said can bodies, wiper mechanism for wiping the applied solder, adjusting means associated with said supporting means for altering the predetermined position for said horn, and adjusting means associated with said feeding devices, fluxing devices, instrumentalities, heating means and wiper mechanism for changing their positions to properly coordinate with the changed position of said horn.

WILLIAM M. HOLLOWAY.